United States Patent
Zinevich

(10) Patent No.: US 9,414,126 B1
(45) Date of Patent: Aug. 9, 2016

(54) PASSIVE TIME DOMAIN REFLECTOMETER FOR HFC NETWORK

(71) Applicant: Victor M. Zinevich, Voronezh (RU)

(72) Inventor: Victor M. Zinevich, Voronezh (RU)

(73) Assignee: ARCOM DIGITAL, LLC, Syracuse, NY (US)

( * ) Notice: Subject to any disclaimer, the term of this patent is extended or adjusted under 35 U.S.C. 154(b) by 0 days.

(21) Appl. No.: 14/642,579

(22) Filed: Mar. 9, 2015

(51) Int. Cl.
*H04N 17/00* (2006.01)
*H04N 21/647* (2011.01)
*H04N 21/61* (2011.01)

(52) U.S. Cl.
CPC ......... *H04N 21/6473* (2013.01); *H04N 17/004* (2013.01); *H04N 21/6118* (2013.01); *H04N 21/6168* (2013.01)

(58) Field of Classification Search
CPC combination set(s) only.
See application file for complete search history.

(56) References Cited

U.S. PATENT DOCUMENTS

| | | | |
|---|---|---|---|
| 6,385,237 B1 | 5/2002 | Tsui et al. |
| 7,069,163 B2 | 6/2006 | Gunther |
| 7,271,596 B2 | 9/2007 | Furse et al. |
| 7,415,367 B2 | 8/2008 | Williams |
| 7,584,496 B2 | 9/2009 | Zinevich |
| 7,788,050 B2 | 8/2010 | Williams |
| 8,908,538 B1 | 12/2014 | Williams |
| 9,054,782 B2 | 6/2015 | Hunter |
| 9,100,339 B1 | 8/2015 | Hamzeh |
| 9,160,463 B2 | 10/2015 | Hunter |
| 9,209,863 B2 | 12/2015 | Williams et al. |
| 2008/0220723 A1 | 9/2008 | Krishnamoorthi et al. |
| 2011/0194418 A1 | 8/2011 | Wolcott et al. |
| 2011/0194597 A1 | 8/2011 | Wolcott et al. |
| 2013/0176860 A1 | 7/2013 | Wolcott et al. |
| 2014/0153624 A1 | 6/2014 | Wolcott et al. |
| 2014/0241409 A1 | 8/2014 | Wolcott et al. |
| 2014/0254392 A1 | 9/2014 | Wolcott et al. |
| 2014/0254407 A1 | 9/2014 | Williams |
| 2014/0294052 A1 | 10/2014 | Currivan et al. |
| 2015/0043624 A1 | 2/2015 | Williams et al. |
| 2015/0139349 A1 | 5/2015 | Hamzeh |
| 2015/0229416 A1 | 8/2015 | Williams |
| 2015/0341810 A1 | 11/2015 | Murphy |

OTHER PUBLICATIONS

CableLabs®, Data-Over-Cable Service Interface Specifications, DOCSIS® 3.1Physical Layer Specification CM-SP-PHYv3.1-I03-140610, Jun. 10, 2014, pp. 1-239, Cable Television Laboratories, Inc., Louisville, CO, www.cablelabs.com/wp-content/uploads/specdocs/CM-SP-PHYv3.1-I03-140610.pdf.

(Continued)

*Primary Examiner* — Kieu Oanh T Bui
(74) *Attorney, Agent, or Firm* — Lawrence P. Trapani, Esq.

(57) ABSTRACT

Detecting a linear impairment in a cable under test by using a random signal transmitted down the cable. The impairment causes a reflected signal to be combined with the random signal. The combined signal extends over a plurality of sub-bands. A method and apparatus perform the steps of: (a) receiving the combined signal from a test point upstream from the impairment; (b) tuning to each sub-band and receiving a part of the combined signal within each sub-band; (c) determining an autocorrelation function of each part of the combined signal of each sub-band, to produce a plurality of autocorrelation functions; (d) combining the autocorrelation functions to form a combined function; (e) detecting the reflected signal from the combined function; and (f) determining, from the combined function, a time delay associated with the reflected signal and the distance from the test point to the impairment.

20 Claims, 11 Drawing Sheets

(56) References Cited

OTHER PUBLICATIONS

Williams, Thomas & Campos, Alberto, Presentation entitled, Distortion Testing in Home Terminals, CableLab® SCTE Conference Demo, Oct. 21-24, 2013, p. 1, Cable Television Laboratories, Inc., Louisville, CO.

Sugiura, Kawamura, and Iiguni, A Comb Filter with Adaptive Notch Gain for Periodic Noise Reduction, Osaka University, Osaka, Japan, E-mail: yosuke@sip.sys.es.osaka-u.acjp, Oct. 9, 2012, pp. 1-5, Osaka Univ., Osaka, Japan.

Williams, Thomas, Non-Service Interrupting Time Domain Reflectometer (TDR) Using Bidirectional Injection, Aug. 29, 2012, pp. 1-4, Cable Television Laboratories, Inc., Louisville, CO.

Docsis® Best Practices and Guidelines, Proactive Network Maintenance Using Pre-equalization, CM-GL-PNMP-V02-110623, Jun. 23, 2011, pp. 1-133, Cable Television Laboratories, Inc., Louisville, CO, www.cablelabs.com/wp-content/uploads/2014/05/CM-GL-PNMP-V02-110623.pdf.

Arcom Digital, LLC, Hunter® Xcor System (www.arcomlabs.com/4HunterPlatform.html), Hunter with Xcor, The Ultimate Network-Hardening Tool, Mar. 9, 2011, pp. 1-2, Arcom Digital, LLC, Syracuse, NY.

Arcom Digital, LLC, QTP-20 Test Probe, Quiver, a Field Unit That Tracks Network Impairments to Within a Few Feet, Feb. 16, 2011,pp. 1-3, Arcom Digital, LLC, Syracuse, NY, www.arcomlabs.com/images/documents/quiver_sell_sheet.pdf.

Hranac, Ron, A Novel Approach to Troubleshooting Linear Distortions, Cablefax.com, Oct. 1, 2010, pp. 1-3, Cablefax Daily, www.cablefax.com/archives/a-novel-approach-to-troubleshooting-linear-distortions.

Wikipedia, Comb Filter, Apr. 22, 2010, pp. 1-7, https://en.wikipedia.org/wiki/Comb_filter.

Microtune, MICROTUNER™ MT2068, Single-Chip Broadband Tuner, Preliminary Data Sheet, May 12, 2008, pp. 1-2, Microtune, Inc., Plano, TX, www.alldatasheet.com/datasheet-pdf/pdf/239906/MICROTUNE/MT2068.html.

Moran, Jack, Slide Presentation, RF Impairments in the Return Path & Their Impact on a DOCSIS Performance or be RF World According to Jack, Jan. 13, 2004, pp. 1-54, Motorola-BCS, Marlborough, MA.

Cyrill, D, McNames, J & Aboy, M, Adaptive Comb Filter for Quasi-Periodic Physiologic Signals, May 27, 2003, pp. 1-4, IEEE.

PASSIVE TIME DOMAIN REFLECTOMETER FOR HFC NETWORK

BACKGROUND OF THE INVENTION

1. Field of Invention

The present invention relates generally to monitoring impairments in a Hybrid Fiber-Coax (HFC) network, and more particularly to apparatus and methods for detecting and locating linear impairments such as, but not limited to, impedance mismatches causing micro-reflections in a coaxial cable plant of an HFC network.

2. Background Art

The detection and location of different linear distortions (e.g., from impedance mismatches) in a modern HFC network that carries digital signals is a challenging problem. Traditional methods of detection and location of such impairments have involved Time-Domain Reflectometry (TDR). In general, TDR involves the injection of a high power probe signal or pulse into the cable ("active TDR") and the measurement of the time delay, level and polarity of the echo signal reflected from different mismatches. However, in a coaxial cable plant of an HFC network, the use of active TDR becomes tricky because of the presence of a wideband downstream spectrum of service signals, including analog TV channels, digital QAM channels, digital OFDM signals, AGC pilots, and the like. The probe signal or pulse will likely interfere with the service signals. Thus, active TDR may not be suitable or practical for a commercial HFC network.

In the scenario where a network must be tested while service signals (or commercial signal traffic) are present in the network (e.g., in a cable TV network, data wire lines in an aircraft or ship, radar, radio intelligence, radio astronomy, non-linear radar, etc.), systems have been developed that use the service signals as a probe signal. For example, see U.S. Pat. No. 7,069,163 to Gunther, where the original data signals on aircraft wires are altered by spread spectrum techniques and then used as a probe signal. The use of existing service signals as the probe signal is referred to herein as a "passive" technique, because no extra (or active) probe signal is introduced. The system proposed in U.S. Pat. No. 7,069,163 to Gunther is not a truly passive technique, however, because it creates a separate probe signal from the original data signals and injects the probe signal into the wire under test (which is also carrying the unaltered original data signals). In the HFC cable television industry, a truly passive technique is used (i.e., a kind of nonlinear radar technology) for detection and location of common path distortion (a nonlinear impairment). This technology is commercially available and known as the Hunter® Xcor system available from Arcom Digital, LLC, Syracuse, N.Y. (http://www.arcomlabs.com/4HunterPlatform.html). The Hunter® Xcor system is described in U.S. Pat. No. 7,415,367 to Williams and in U.S. Pat. No. 7,584,496 to Zinevich (the inventor herein).

A passive technique is also known for the detection of linear (as opposed to nonlinear) impairments in a coaxial cable plant of an HFC network. This technique was developed by CableLabs® as part of the Proactive Network Maintenance (PNM) initiative and is known as InGeNeOs™. It is described in a published document entitled, DOCSIS® Best Practices and Guidelines, Proactive Network Maintenance Using Pre-Equalization, CM-GL-PNMP-V02-110623, by Cable Television Laboratories, Inc., Louisville, Colo., Jun. 23, 2011 (http://www.cablelabs.com/wp-content/uploads/2014/05/CM-GL-PNMP-V02-110623.pdf). The InGeNeOs™ technique is based on using pre-equalization coefficients from cable modems (CMs) operating in the HFC network. It can be classified as a form of passive TDR, because upstream QAM service signals are used as probe signals. Briefly, this technique allows by analysis of pre-equalization coefficients the detection of micro-reflections of an upstream QAM signal on its way from the CM to the CMTS, and a time delay of a reflected signal relative to the initial signal is measured. Then, by using electronic maps a probable point in the network where the micro-reflections were caused (impedance mismatches) is located. The declared accuracy of this technique is about +/−50 feet. Obviously, it is not as accurate as active TDR, and the accuracy is limited by the bandwidth of one upstream QAM channel. Currently, this technology is widely used in cable TV HFC networks.

When a technician is in the field, it would be very helpful for him or her to use a handheld meter to further pinpoint the location of the mismatch in the coaxial plant, and confirm after the work has been done that the problem has been fixed. In using the above-mentioned pre-equalization method, the technician would have to connect to a CMTS and poll data from the CM that has initially raised an alarm of the problem. Obviously, this would provide the most valid confirmation that a problem (mismatch) has been fixed, but it takes extra time, effort and equipment and does not offer the capability of pinpointing the mismatch to less than +/−50 feet. Also, it is limited to the use of upstream signals only. It would be more sensible, from the point of view of locating mismatches in an HFC coaxial plant, to use the higher frequency, broader bandwidth downstream signals to detect linear impairments such mismatches.

CableLabs® has proposed to use the full downstream signal as a passive probe signal. The downstream signal would be captured by modern CMs containing a new Broadcom® chipsets. See, e.g., presentation entitled, Distortion Testing in Home Terminals, CableLabs® SCTE Conference Demo, Oct. 21-24, 2013, by Thomas Williams and Alberto Campos. The idea is to download from the CM a captured full-spectrum downstream signal and then calculate the autocorrelation function of the captured signal combined with an echo of the captured signal. The echo will appear as a spike in addition to the main detection peak in the autocorrelation function. Thus, the time-distance between the main peak and the echo spike can be measured, and this will allow one to measure a time delay of the echo signal more accurately than the approach using pre-equalization coefficients. However, this method has some drawbacks. First, to provide good sensitivity of detection of the echo, the accumulation time during the estimation of the autocorrelation function should be long enough, e.g., tens of milliseconds, while the duration of the captured full downstream signal at the CM (used generally for spectral analysis) is limited to tens of microseconds. The capture duration at the CM is limited so as to achieve a reasonable resolution bandwidth for spectral analysis (e.g., 30 kHz) and a reasonable data size for one capture (e.g., 30 Kbytes). Therefore, to achieve an adequate accumulation time it will be necessary to make a large number of captures. However, this will take time and impact CM signal traffic. Another limitation of this method is that continuous wave (CW) or narrowband downstream signals, such as analog video carriers, AGC pilots, and OFDM continuous pilot sub-carriers, may be included in the autocorrelation, which would contribute flat or spread components in the autocorrelation function and may cause an echo spike to be masked. This could reduce sensitivity and time resolution (or distance accuracy).

Obviously, for the scenario of pinpointing linear impairments within the last tens of feet, the technician will not actually have an opportunity to check linear distortion by polling data from nearby CMs. Also, implementing a method that captures the whole downstream signal in a handheld meter for analysis will not be cost effective, because high resolution analog-to-digital converter chips, with sampling rates higher than 2 GHz are needed to capture the downstream signal. The chips are still very expensive and have high power consumption (e.g., a few Watts). Also, to undertake the necessary signal processing of a full downstream spectrum, a powerful, high cost, high power consuming, computer processor would be required.

Neither the pre-equalization coefficients method nor the whole-downstream signal capture method discussed above is actually a classical TDR method, where the time delay of the echo signal is measured relative to a connection point of the TDR meter. Both methods detect only the fact that reflections have occurred between the CM and the fiber node, or vice versa. Therefore, both methods require a complex analysis of data from many CMs and correlation of data with electronic maps. The above methods are definitely useful from the point of view of alerting operators of the presence of linear impairments and identifying a probable zone of locations of the mismatched device(s). However, they are less useful for pinpointing mismatches within the last tens of feet in a field search for mismatches.

Another known method and system for testing a network path while carrying operational (or service) signals is described in U.S. Pat. No. 7,271,596. This patent describes a method of passive TDR based on estimating an autocorrelation function of the full-spectrum operational signal. However, in a modern HFC television network, the capturing and processing of the full-spectrum operational signal and estimating its autocorrelation function is not a trivial task and has certain drawbacks, as discussed above and listed here:

(1) The HFC cable television downstream signal has a very wide bandwidth (e.g., 1 GHz with a probable increase to 1.7 GHz under DOCSIS 3.1). Therefore, sampling and digitally processing this signal requires expensive and high power-consuming chipsets, which make it impractical to implement a passive TRD system in a low-cost handheld unit.

(2) The HFC cable television downstream signal is not completely random and includes many CW pilots which have flat or spread autocorrelation responses. Such flat responses may mask an echo spike in the autocorrelation function. Even with infrastructure migration to all digital signals, the OFDM signal contains a number of continuous pilot subcarriers as part of the OFDM spectrum. The detection of OFDM pilot subcarriers and Fast Fourier Transform (FFT) processing of such signals requires a minimum 1 kHz resolution. This means that if the full downstream spectrum signal is captured, the number of points for the FFT process would be extremely large, like approximately 2 GHz/1 kHz=2×10^6.

(3) TDR is generally used in a section of a coaxial plant that contains only passive network devices ("passive section"), e.g., between adjacent line or trunk amplifiers. Downstream signals passing through an amplifier may already contain reflected signals which could, in an autocorrelation function, mask echo spikes of impairments located in the passive section under test and create false detections (see FIG. 10). Even random signals, which would theoretically produce Dirac autocorrelation functions, may have extra, undesired peaks and sidelobes in their autocorrelation functions after passing through branches of the HFC network with cascaded amplifiers. These extra peaks and sidelobes may interfere with desired measurements.

As a result of the above-discussed problems, it has been a challenge to attempt a low-cost, low power-consuming implementation of a passive TDR system for an HFC cable television network. Accordingly, a need exists for an innovative approach that will make it possible and practical to achieve such an implementation in a portable hand-held unit.

OBJECTS AND SUMMARY OF THE INVENTION

It is therefore an object of the present invention to overcome the problems associated with the prior art and to fulfill the aforesaid need.

It is another object of the present invention to provide passive TDR ("P-TDR") measurement apparatus and methods for coaxial cable plants of HFC networks.

It is a further object of at least some embodiments of the present invention to provide P-TDR measurement apparatus and methods that can locate a linear impairment in a coaxial cable plant with an accuracy of less than 50 feet.

It is still another object of the present invention to provide P-TDR measurement apparatus and methods for an HFC network, where the passive probe signal is the full spectrum or a substantial portion of the full spectrum of the downstream service signals of the network.

It is still a further object of the present invention to provide P-TDR measurement apparatus and methods that achieve good detection sensitivity of linear impairments.

It is yet another object of the present invention to provide P-TDR measurement apparatus and methods for an HFC network that will not impact CM and CMTS signal traffic, downstream signal traffic, or any other signal traffic in the HFC network.

It is yet a further object of the present invention to provide P-TDR measurement apparatus and methods for an HFC network that can select random signals of the downstream signal for use as a passive probe signal, to enhance sensitivity and accuracy of measurements.

It is yet still another object of the present invention to provide a field-deployable, portable, hand-held P-TDR meter that utilizes a substantial portion of the full spectrum of downstream service signals in an I-IFC network to detect and locate linear impairments.

It is yet still a further object of the present invention to provide a low-cost, low power-consuming, and accurate P-TDR meter that utilizes a very wide frequency spectrum of the downstream signal in an HFC network as a passive probe signal for P-TDR measurements.

It is yet still another object of the present invention to provide a method for estimating the autocorrelation function of a wideband RF signal by splitting the spectrum into sub-bands and determining the autocorrelation function of the signal in each sub-band, and then combining the autocorrelation functions of the sub-bands to construct a composite autocorrelation function.

It is yet still another object of the present invention to provide a method of compensating for or canceling interference in a P-TDR autocorrelation function, caused by sidelobes of the autocorrelation function and correlation peaks of reflected or undesired signals originating from outside a cable section under test.

These and other objects are attained in accordance with the present invention, wherein there is provided, in one embodiment, a time domain reflectometry apparatus for detecting a linear impairment in a cable under test. A random signal is carried down the cable under test. The linear impairment causes a portion of the random signal to be reflected back up the cable as a reflected signal. The reflected signal is combined with the random signal to form a combined signal. The combined signal contains frequencies extending over a wide frequency spectrum defined by a plurality of sub-bands. The apparatus includes an input, a tunable receiver coupled to the input, an autocorrelation processor coupled to the receiver, an accumulator coupled to the autocorrelation processor, a detector coupled to the accumulator, and a time delay module associated with the detector. The input is to be coupled to the cable under test, at a test point upstream from the linear impairment, for receiving the combined signal. The tunable receiver tunes to each sub-band of the spectrum and receives a part of the combined signal in each sub-band, one sub-band at a time. The auto-correlation processor determines an autocorrelation function of the part of the combined signal in each sub-band, one sub-band at a time, to produce a plurality of autocorrelation functions for the plurality of sub-bands, respectively. The accumulator combines the plurality of autocorrelation functions together to form a combined autocorrelation function, representing the autocorrelation function of the combined signal over the whole frequency spectrum. The detector detects the reflected signal from the combined autocorrelation function. The time delay module determines from the combined autocorrelation function a time delay associated with the reflected signal and with the distance from the test point to the linear impairment. The apparatus may further include a module or routine for determining the distance from the test point to the linear impairment based on the time delay.

Methods of detecting a linear impairment in a cable under test are also contemplated by the present invention. In one embodiment, a method involves detecting a linear impairment in a cable under test that carries a random signal. The linear impairment causes a portion of the random signal to be reflected as a reflected signal. The reflected signal is combined with the random signal to form a combined signal. The combined signal extends over a wide frequency spectrum defined by a plurality of sub-bands. In this embodiment, the method comprises the steps of: (a) receiving the combined signal from the cable under test at a test point upstream from the linear impairment; (b) tuning to each sub-band of the spectrum and receiving a part of the combined signal in each sub-band, one sub-band at a time; (c) determining an autocorrelation function of the part of the combined signal in each sub-band, one sub-band at a time, to produce a plurality of autocorrelation functions for the plurality of sub-bands, respectively; (d) combining the plurality of autocorrelation functions together to form a combined autocorrelation function, representing the autocorrelation function of the combined signal over the whole frequency spectrum; (e) detecting the reflected signal from the combined autocorrelation function; and (f) determining, from the combined autocorrelation function, a time delay associated with the reflected signal and with the distance from the test point to the linear impairment. The method may further include the step of: (g) determining the distance from the test point to the linear impairment based on the time delay determined in step (f).

In another embodiment of the present invention, a method of detecting a linear impairment in an HFC network is presented. The HFC network carries a plurality of substantially random signals in a plurality of sub-bands, respectively, over a wide frequency spectrum. The linear impairment causes the plurality of substantially random signals to be reflected as a reflected signal. The reflected signal is combined with the substantially random signals to form a combined signal extending over the plurality of sub-bands, where each sub-band contains a part of the combined signal. In this embodiment, the method comprises the steps of: (a) receiving the combined signal from the HFC network at a test point remote from the linear impairment; (b) for each sub-band, down-converting the part of the combined signal to an in-phase baseband signal and a quadrature baseband signal, to produce in-phase and quadrature baseband signals; (c) for each sub-band, determining a baseband autocorrelation function of the in-phase baseband signal and a baseband cross-correlation function of the in-phase and quadrature baseband signals; (d) for each sub-band, up-sampling the baseband autocorrelation function and the baseband cross-correlation function to an up-sampled autocorrelation function and an up-sampled cross-correlation function, respectively; (e) for each sub-band, up-converting the up-sampled autocorrelation function and the up-sampled cross-correlation function to a frequency band corresponding to the sub-band; (f) for each sub-band, constructing a sub-band autocorrelation function from the up-converted up-sampled autocorrelation function and the up-converted up-sampled cross-correlation function; (g) accumulating the sub-band autocorrelation functions constructed in step (f) to form a combined autocorrelation function corresponding to an autocorrelation function of the combined signal, the combined autocorrelation function including a correlation peak associated with the reflected signal and the linear impairment; (h) detecting the reflected signal from the correlation peak of the combined autocorrelation function; and (i) determining from the correlation peak a time delay associated with the reflected signal and the distance from the test point to the linear impairment.

A further embodiment involves a method of detecting a linear impairment in a coaxial cable plant that carries a downstream signal. The linear impairment is located downstream of an amplifier in the coaxial cable plant. The amplifier has an input for receiving the downstream signal from upstream of the amplifier and an output for passing the downstream signal to the downstream of the amplifier. The linear impairment causes the downstream signal to be reflected upstream as a reflected signal. The reflected signal is combined with the downstream signal to form a combined signal at the output of the amplifier. In this embodiment, the method comprises the steps of: (a) receiving the downstream signal from a first test point at about the input of the amplifier; (b) determining a first autocorrelation function of the downstream signal received in step (a); (c) receiving the combined signal from a second test point at about the output of the amplifier; (d) determining a second autocorrelation function of the combined signal received in step (c); (e) normalizing the first and the second autocorrelation functions; (f) subtracting the normalized first autocorrelation function from the normalized second autocorrelation function to produce a resultant function, where the resultant function is substantially free from measurement interference associated with the second autocorrelation function and detectably reveals a correlation peak associated with the reflected signal and the linear impairment; (g) detecting the reflected signal from the correlation peak of the resultant function; and (h) determining from the correlation peak a time delay associated with the reflected signal and the distance from the second test point to the linear impairment.

Yet another embodiment involves a method of compensating for measurement interference in the detection of a linear impairment. The linear impairment is located downstream of an amplifier in a coaxial cable plant that carries a downstream signal. The amplifier has an input for receiving the downstream signal from upstream of the amplifier and an output for passing the downstream signal to the downstream of the amplifier. The linear impairment causes the downstream signal to be reflected upstream as a reflected signal. The reflected signal is combined with the downstream signal to form a combined signal at the output of the amplifier. In this embodiment, the method comprises the steps of: (a) receiving the downstream signal from a first test point at about the input of the amplifier; (b) determining a first autocorrelation function of the downstream signal received in step (a); (c) receiving the combined signal from a second test point at about the output of the amplifier; (d) determining a second autocorrelation function of the combined signal received in step (c), where the second autocorrelation function includes a correlation peak associated with the reflected signal and the linear impairment, and where the correlation peak is obscured by measurement interference associated with the second autocorrelation function; (e) normalizing the first and the second autocorrelation functions; and (f) subtracting the normalized first autocorrelation function from the normalized second autocorrelation function to produce a resultant function, where the resultant function is substantially free from the measurement interference associated with the second correlation function and detectably reveals the correlation peak.

BRIEF DESCRIPTION OF THE DRAWING

Further objects of the present invention will become apparent from the following description of preferred embodiment, with reference to the accompanying drawing, in which.

DETAILED DESCRIPTION OF THE PREFERRED EMBODIMENT

Figure 1:
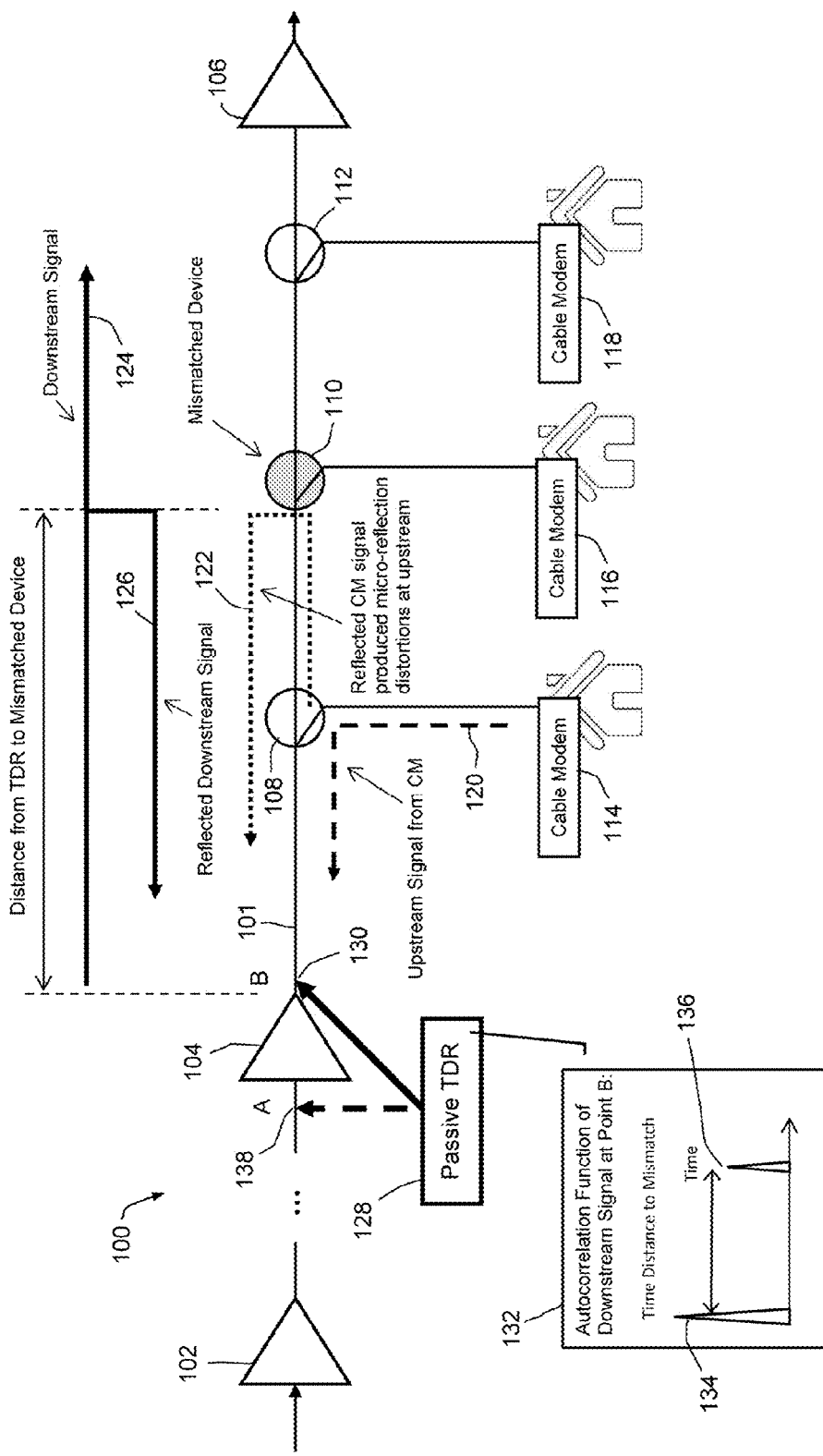
FIG. 1 is a block diagram showing a portion of a coaxial cable plant of an HFC network containing an impedance mismatch which causes micro-reflections of downstream and upstream signals, and showing a P-TDR meter coupled to the coaxial cable plant.

Referring to FIG. 1, there is shown a block diagram of a portion of a coaxial cable plant 100 of an HFC network. Plant 100 includes cascaded amplifiers 102, 104 & 106 and multi-taps 108, 110 & 112, mounted along a trunk or branch hardline coaxial cable 101. A number of subscriber-based cable modems 114, 116 & 118 are connected to plant 100 via multi-taps 108, 110 & 112, respectively. As an example, FIG. 1 shows an impedance mismatch associated with multi-tap 110 (shaded). Also, to illustrate the effects of the mismatch, there is shown an upstream signal 120 from modem 114, a reflection 122 of modem signal 120, a downstream signal 124, and a reflection 126 of downstream signal 124. Reflections 122 and 126 occur at the mismatch at tap 110. A P-TDR meter 128 is coupled to plant 100 at a test point 130, at or near the output of amplifier 104. This is a typical test setup for detecting linear impairments in a coaxial plant of an HFC network. This setup is used between adjacent amplifiers, where passive devices are installed on coaxial cable 101. In FIG. 1, meter 128 is coupled between amplifiers 104 & 106 and the passive devices between the amplifiers are taps 108, 110 & 112.

As shown in FIG. 1, a portion of upstream modem signal 120 is leaked from multi-tap 108 (due to limited isolation) and travels downstream to multi-tap ("tap") 110. Because of the mismatch at tap 110, the downstream portion of signal 120 is reflected in the upstream direction to create reflected signal 122. Signal 122 ultimately combines with the original upstream modem signal 120, and the combination travels upstream in the HFC network. This effect is known as a micro-reflection. Micro-reflections adversely impact upstream data transmission, thus driving a requirement to locate and repair (or replace) mismatched devices. As indicated, downstream signal 124 is also reflected in the upstream direction by the mismatch at tap 110, creating reflected signal 126. Signal 126 travels back to amplifier ("amp") 104. This means that if meter 128 is connected to test point 130, reflected signal 126 potentially can be detected. If downstream signal 124 (and thus reflected signal 126) were random signals, it would be sufficient for detection to estimate the autocorrelation function of the combined downstream signal 124 and reflected signal 126, at point 130.

FIG. 1 also shows a plot 132, which is an example of an autocorrelation function for a random version of downstream signal 124, at point 130 (or point B). The function has a main peak 134 and a secondary peak 136. The position of peak 134 represents a zero time delay and the position of peak 136 represents a time delay corresponding to the roundtrip propagation time of signal 124 from point 130 to tap 110 and back (as reflected signal 126). The amplitude of peak 136 depends on the degree of mismatch at tap 110 and the distance traveled by signal 124/126 (related to cable loss). Thus, by measuring the amplitude and time delay of secondary peak 136, the mismatched device (tap 110) can be detected and located. This is the main idea behind passive TDR. It is not complex to understand and it is not new. However, as previously suggested, the practical problems to solve are how to utilize only the random signals from the downstream spectrum, how to make a low-cost autocorrelation estimator that can process a very wide bandwidth RF downstream signal, and how to make a low-cost, handheld P-TDR meter.

Figure 2:
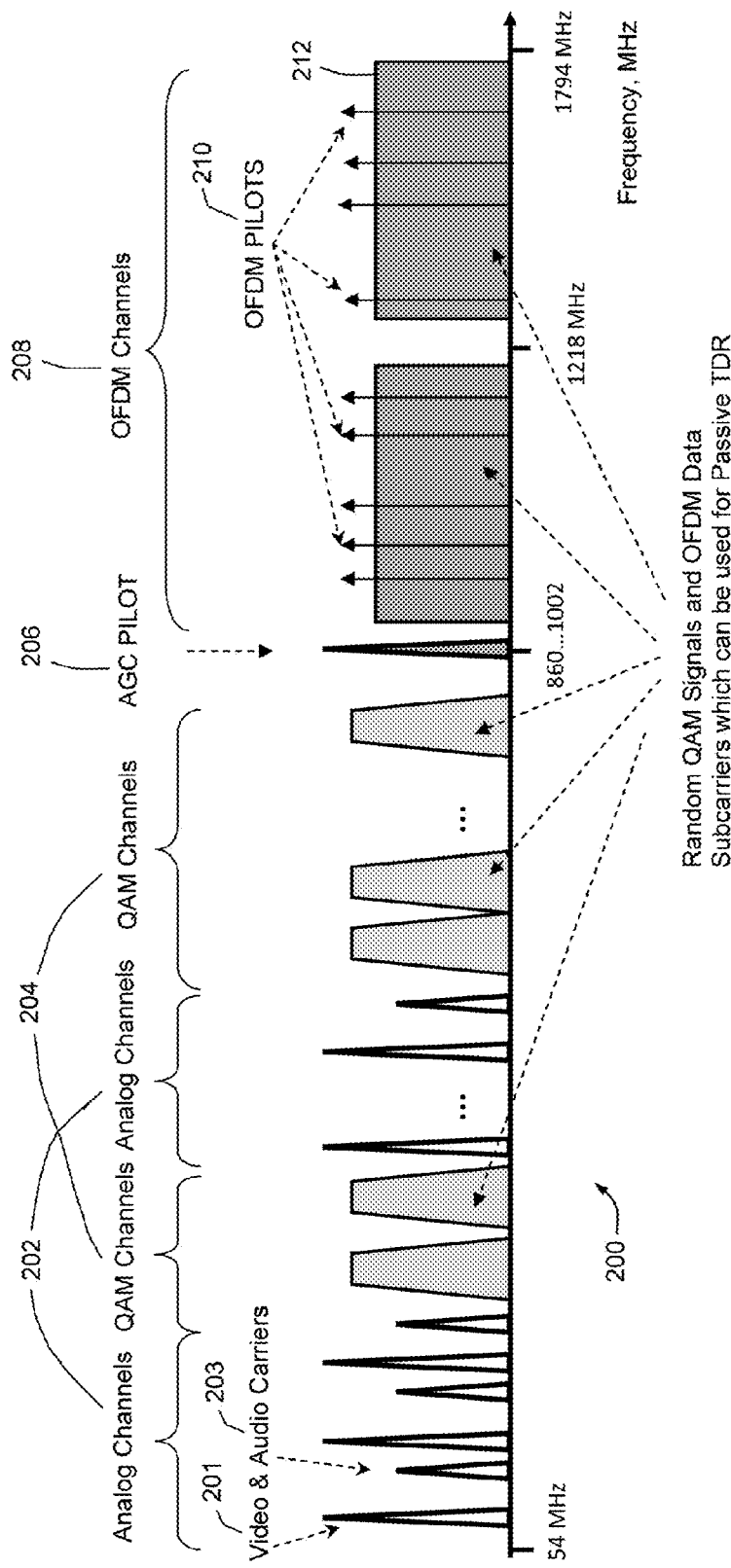
FIG. 2 is a frequency-domain representation or spectrum of an RF downstream signal typically found in an HFC cable television network.

Turning now to FIG. 2, there is shown a RF downstream signal 200 typically found in a modern HFC cable television network. Signal 200 includes a number of dispersed analog channels 202, QAM channels 204, an AGC pilot 206, and an OFDM signal or channels 208. Analog channels 202 include discrete video and audio carriers 201 and 203. "QAM" stands for quadrature amplitude modulation, and "OFDM" stands for orthogonal frequency division multiplexing. In this description of the preferred embodiment, OFDM signal 208 is specified as set forth in the Data-Over-Cable Service Interface Specifications (DOCSIS) 3.1 specification, published by Cable Television Laboratories, Inc. (CableLabs®) of Louisville, Colo., Jun. 10, 2014, a copy of which is incorporated herein by reference. Relevant to the preferred embodiment, OFDM signal 208 includes a number of continuous pilot subcarriers 210 and a number of data subcarriers. The data subcarriers are represented in FIG. 2 as part of a random (shaded) portion 212 of the spectrum of OFDM signal 208. The full spectrum of the downstream signal in an HFC cable television network (in the USA) starts at 54 MHz and continues up to 860-1002 MHz for a DOCSIS 3.0 specified network and up to 1218-1794 MHz for a DOCSIS 3.1 network (FIG. 2). The autocorrelation functions of analog channels 202, AGC pilot 206, and continuous pilots 210 are periodic. The autocorrelation function of these types of signals looks like a number of closely spaced peaks, because the signals are close to a CW carrier. As previously indicated, these signals are not very useful in a P-TDR measurement, because the reflected signal will be masked by a "forest" of correlation peaks. On the other hand, the autocorrelation function of the signals of QAM channels 204 and the data subcarriers of OFDM signal 208 is close to a Dirac delta function, especially as the number of QAM channels and the bandwidth of OFDM signal 208 increases. This is because these signals are random in nature or can be modeled as random signals or processes (hereinafter "a random signal" or "random signals"). Accordingly, one approach of the present invention is to select QAM channels 204 and those parts of OFDM signal 208 containing substantially only data subcarriers, for use as a P-TDR probe signal.

A feature of an RF downstream signal in a modern HFC cable television network with, e.g., a Converged Cable Access Platform (CCAP) architecture, is that, generally, the composition of the downstream signal is different at different nodes. In other words, the location of the QAM channels and the OFMD signals in an RF downstream spectrum will, generally, be different from one node to another. From the point of view of using the random signals of the RF downstream signal for use as a probe signal in a P-TDR system, the following must be considered:

(1) before filtering the random signals, an initial step of spectrum sensing or spectral analysis of the downstream spectrum is required; and (2) the filtering process should be adaptive and based on the spectral analysis in (1).

Spectral analysis is a well-known process and the location of analog channels and AGC pilot carriers is relatively straightforward. However, to locate continuous pilot subcarriers 210 of very wideband OFDM signal 208, a spectral analysis with a resolution bandwidth (RBW) of about 1 kHz is required. (On the other hand, OFDM signal 208 or the random component 212 generally looks like a wide haystack with a flat top.) To capture the full RF downstream spectrum (as proposed in the prior art), using a 1 kHz RBW, the number of points in the FFT analyzer will be very high, like about 10^6. So, the FIT calculation will be a big challenge for a low-cost, low-power consuming TDR meter. Filtering only random signals from the downstream spectrum is also a challenge if one must first capture the full RF downstream spectrum, because an FFT and an inverse FFT with a large number of points would still be required. The present invention involves a much more simple way of processing. The preferred embodiment uses a tunable receiver or down-converter in combination with IF SAW and digital filters to select sub-bands of the full spectrum containing substantially only random signals. Thus, for both the spectrum sensing and filtering processes, a low-cost narrowband receiver or down-converter is used. But, how does one estimate the autocorrelation function of a very wide bandwidth downstream signal with a narrowband low-cost down-converter? A wideband random signal is desired in a P-TDR system to provide very good time delay resolution, needed for a final (or a last tens of feet) search for mismatches. The present invention provides an answer to the question.

Figure 3:
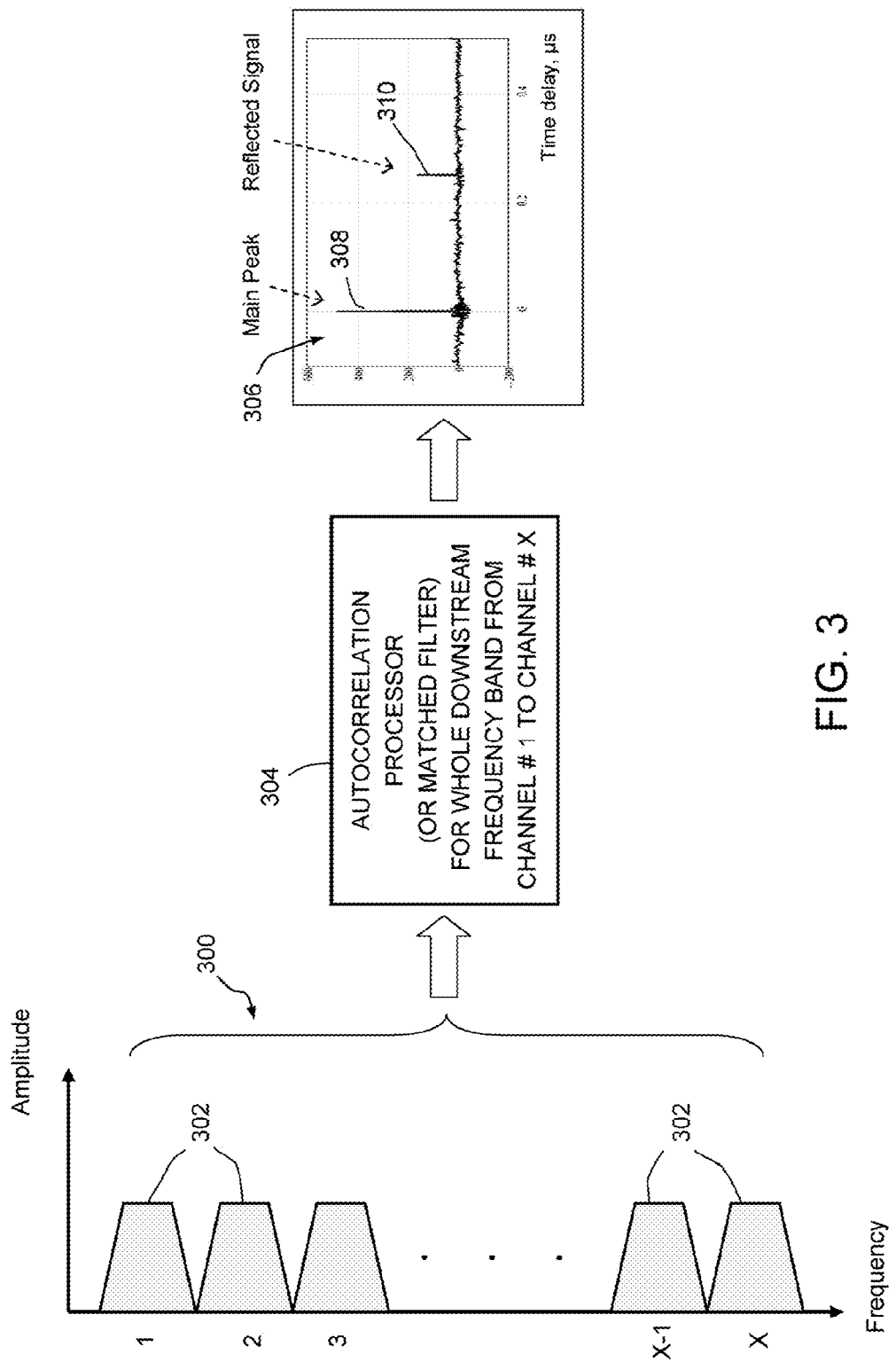
FIG. 3 is a diagram illustrating a classical method of estimating an autocorrelation function using a matched filter, matched to a full spectrum of RF channel signals transmitted in a communication network, such as a modern HFC cable television network.

Turning now to FIG. 3, there is shown a downstream signal 300 containing X number of QAM channels 302. Signal 300 passes through a matched filter 304 and the output of filter 304 is an estimate of the autocorrelation function of signal 300. Also shown in FIG. 3 is an autocorrelation function 306, which is the result of a computer emulation with X=60 QAM channels, each having a 6 MHz bandwidth. So, the total bandwidth of signal 300 (in the emulation) is 6 MHz×60 or 360 MHz. Also, the computer emulation included a reflected signal with a time delay of 0.25 microseconds. As shown, autocorrelation function 306 includes a main peak 308 (corresponding to signal 300) and a secondary peak 310 (corresponding to the reflected signal). This is an ideal signal model and result for a passive TDR measurement.

Figure 4:
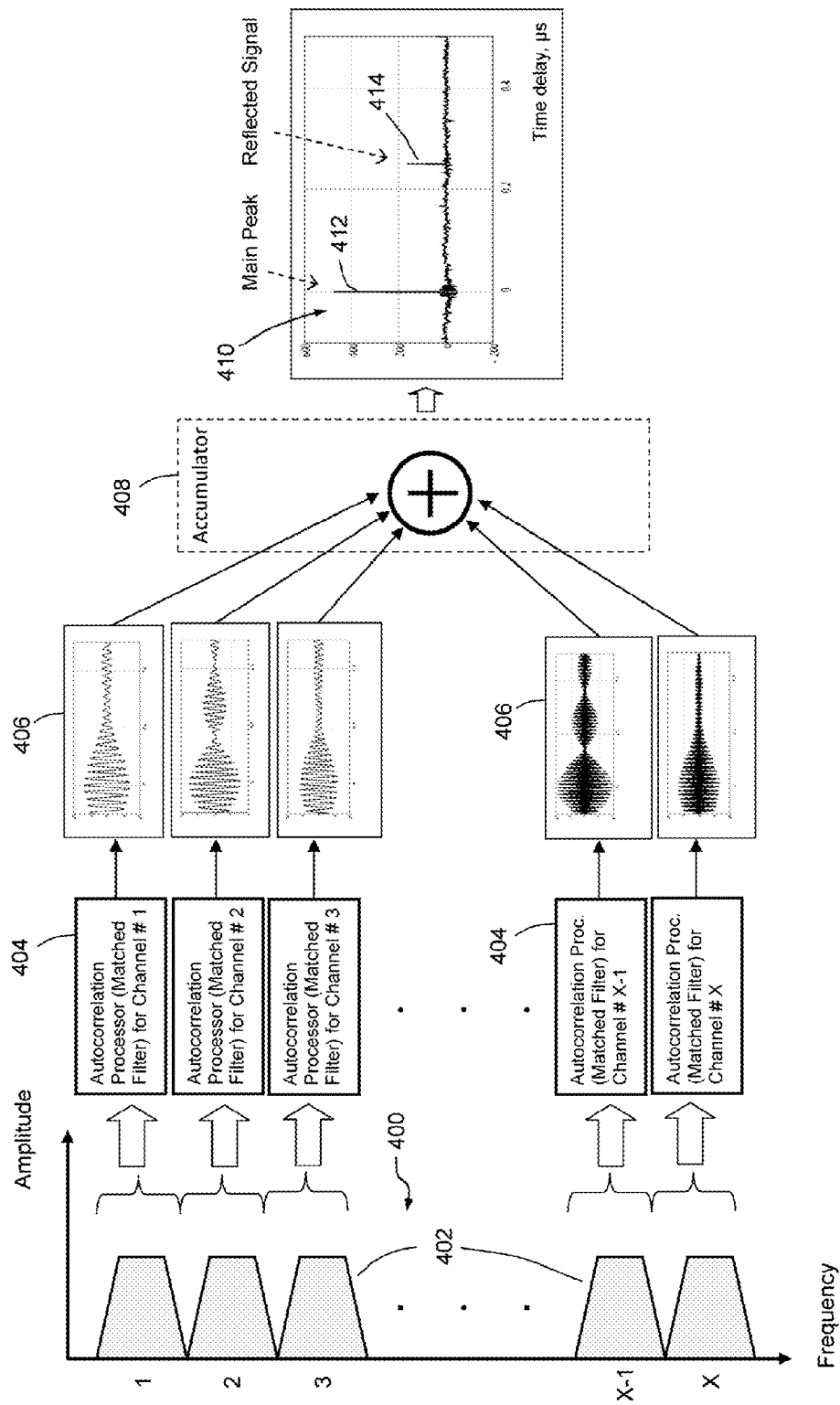
FIG. 4 is a diagram illustrating a method of estimating an autocorrelation function of a wideband spectrum of RF signals by splitting the spectrum into sub-bands and estimating the autocorrelation of each sub-band in parallel and then accumulating or combining (in time) the autocorrelation functions of the multiple sub-bands.

It is a well-known property that the autocorrelation function of the sum of a number of uncorrelated random processes (signals) is equal to the sum of the autocorrelation functions of each random process (or signal). This can be express by an equation (1):

$$A(S)=A(\text{Sum } Si)=\text{Sum}(Ai), \quad (1)$$

where A(S) is the autocorrelation function of the random signals as a combined random signal (e.g., signal 300 in FIG. 3), Si is the ith random signal (e.g., one of QAM channels 302 in FIG. 3), A(Sum Si) is the autocorrelation function of the sum of the random signals, and Ai is the autocorrelation function of the ith random signal. A theoretical implementation of equation (1) is illustrated in FIG. 4. A spectrum of a downstream signal 400 includes X number of QAM channels 402. The signal of each QAM channel 402 passes though a respective narrowband matched filter 404. The outputs of matched filters 404 are autocorrelation functions 406 (Ai) of the signals of QAM channels 402, respectively. Autocorrelation functions 406 are actual results of a computer emulation, where X=60 QAM channels and a reflected signal is modeled with a 0.25 microsecond time delay. The first three functions 406 (corresponding to QAM channels 1-3 in FIG. 4) are for QAM channels having center frequencies of 12, 18 and 24 MHz. The last two functions 406 (corresponding to QAM channels X−1 & X in FIG. 4) are for QAM channels having center frequencies of 360 and 366 MHz. The envelope of each autocorrelation function 406 is approximate to a sin(t)/t function, with the main peak (between zero points) having a width of Wt=2/6 MHz=0.333 μs. The oscillation within the envelope corresponds to the center frequency of the QAM channel signal. The individual autocorrelation functions 406 are summed together in an accumulator 408 (Sum (Ai)) and the combined result is an autocorrelation function 410. Function 410 looks like a Dirac delta function and is exactly the same as function 306 in FIG. 3 (ideal broadband matched filter). Function 410 includes a main peak 412 (corresponding to signal 400) and a secondary peak 414 (corresponding to the reflected signal). Peaks 412 and 414 are the same as peaks 308 and 310 in FIG. 3. Accordingly, the emulation represented in FIG. 4 demonstrates that, instead of estimating the autocorrelation function of the whole signal 400, it is possible to split the spectrum into sub-bands (e.g., QAM channels) and estimate the autocorrelation functions of each sub-band separately, and then simply combine the separate autocorrelation functions.

Figure 5:
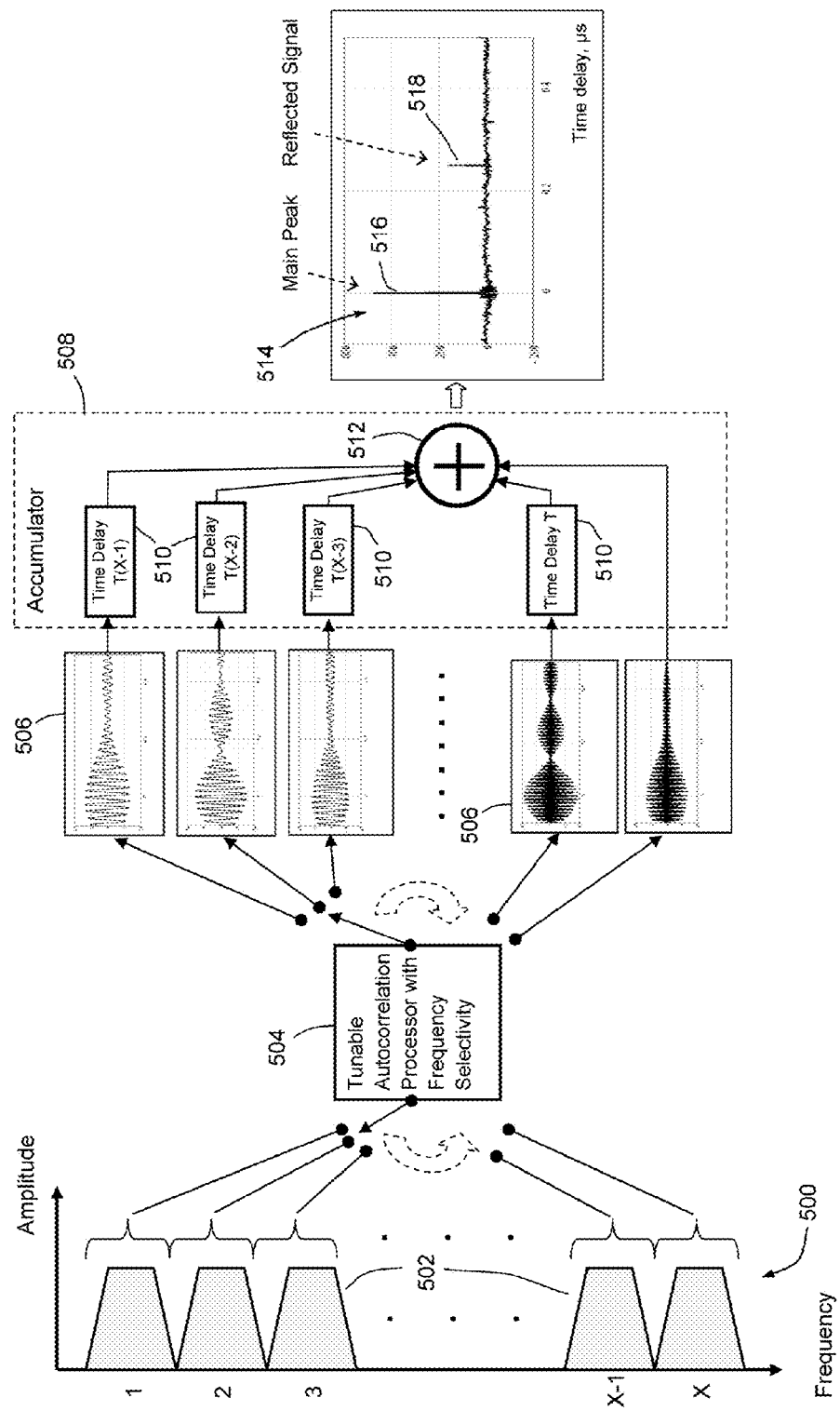
FIG. 5 is a diagram illustrating a method of the present invention for estimating an autocorrelation function of a wideband spectrum of RF signals by tuning a narrowband autocorrelation processor from one sub-band of the spectrum to another and accumulating or combining the autocorrelation functions of the multiple sub-bands.

The next step in creating a preferred embodiment of the present invention is to design a narrowband matched filter or autocorrelation processor, which is tunable to any desired sub-band. A tunable processor will make the estimation of the autocorrelation function of the full downstream spectrum much simpler and less expensive than prior art methods. The idea is illustrated in FIG. 5. A spectrum of a downstream signal 500 includes X number of QAM channels 502 (as in FIGS. 3 & 4). In accordance with the present invention, a narrowband tunable autocorrelation processor 504, with frequency band selectivity, is provided. Frequency band selectivity means the bandwidth of processor 504 can be changed for different sub-band width requirements (e.g., 6 MHz, 30 MHz, etc.) and notch filter frequencies can be defined and tuned as required. Processor 504 may be realized as a matched filter or as a cross-correlation processor (used here to perform an autocorrelation). Thus, the meaning of the term "autocorrelation processor" in this specification includes a suitably configured matched filter implementation or a cross-correlation processor implementation. Processor 504 processes QAM channels 502, one-at-a-time. Processor 504 tunes to each QAM channel 502 (channels 1, 2, 3 . . . X−1, X) and estimates the autocorrelation function of each channel, seriatim. Note that, for stationary random processes like QAM signals or OFDM data carriers, the time at which the autocorrelation functions are calculated does not theoretically matter. In practice, serial processing of the channels (or other defined sub-bands) will yield sufficiently accurate results. The outputs of processor 504 are individual autocorrelation functions 506 of QAM channels 502, respectively. Autocorrelation functions 506 are actual results of a computer emulation, where X=60 QAM channels and a reflected signal is modeled with a 0.25 microsecond time delay (same as FIGS. 3 & 4). Autocorrelation functions 506 enter an accumulator 508 for further processing. Accumulator 508 includes a set of delay lines 510 and a signal summer 512. Functions 506 are delayed in delay lines 510, respectively. For channel 1 of QAM channels 502, the time delay of corresponding delay line 510 is T(X−1), where X is the number of QAM channels 502 and T is the time of calculation or estimation of autocorrelation function 506 (for one QAM channel). In this embodiment, time T is uniform for all QAM channels. For channel 2, the time delay of corresponding delay line 510 is T(X−2); for channel 3, the time delay is T(X−3); and so forth. The autocorrelation function 506 corresponding to channel X is not delayed (as shown). The un-delayed function 506 for channel X and the delayed functions 506 (from delay lines 510) for all other channels are combined together at the same time in summer 512. The resulting function is a combined autocorrelation function 514 having a main peak 516 and a secondary peak 518. A comparison of function 514 with function 306 confirms that the two functions are the same, i.e., the autocorrelation function resulting from tunable processing (FIG. 5) is the same as the autocorrelation function resulting from an ideal matched filter (FIG. 3), for X number of QAM channels.

A tunable autocorrelation processor of the present invention is based further on a property of autocorrelation functions for narrowband random processes, as expressed in an equation (2):

$$A(t)=AI(t)\cos(2\pi f_0 t)+AIQ\sin(2\pi f_0 t), \quad (2)$$

where A(t) is the autocorrelation function of a narrowband random process at center frequency $f_0$; AI(t) is the autocorrelation function of the in-phase (I) component of the random process at center frequency $f_0$; and AIQ is the cross-correlation function of the in-phase (I) and quadrature (Q) components of the random process at center frequency $f_0$. One embodiment of the present invention includes a unique implementation of equation (2). In accordance with the present invention, the autocorrelation function of a narrowband random signal, at frequency $f_0$, is estimated by: (a) performing a quadrature demodulation of the narrowband random signal to create in-phase (I) and quadrature (Q) baseband signals; (b) estimating the autocorrelation function of the I baseband signal (rather than at frequency $f_0$); (c) estimating the cross-correlation function of the I and Q baseband signals; and (d) performing quadrature modulation back to frequency $f_0$ (or other frequency corresponding to $f_0$). Quadrature demodulation of RF signals is widely used and demodulator chipsets are very inexpensive. Also, calculating the auto- and cross-correlation functions at baseband requires a much lower clock rate than if done at RF. Further, if the RF signal is down-converted to an IF signal before quadrature demodulation to baseband, it becomes easier to frequency select the random QAM and OFDM signals and filter out undesired carriers or narrowband signals.

Figure 6:
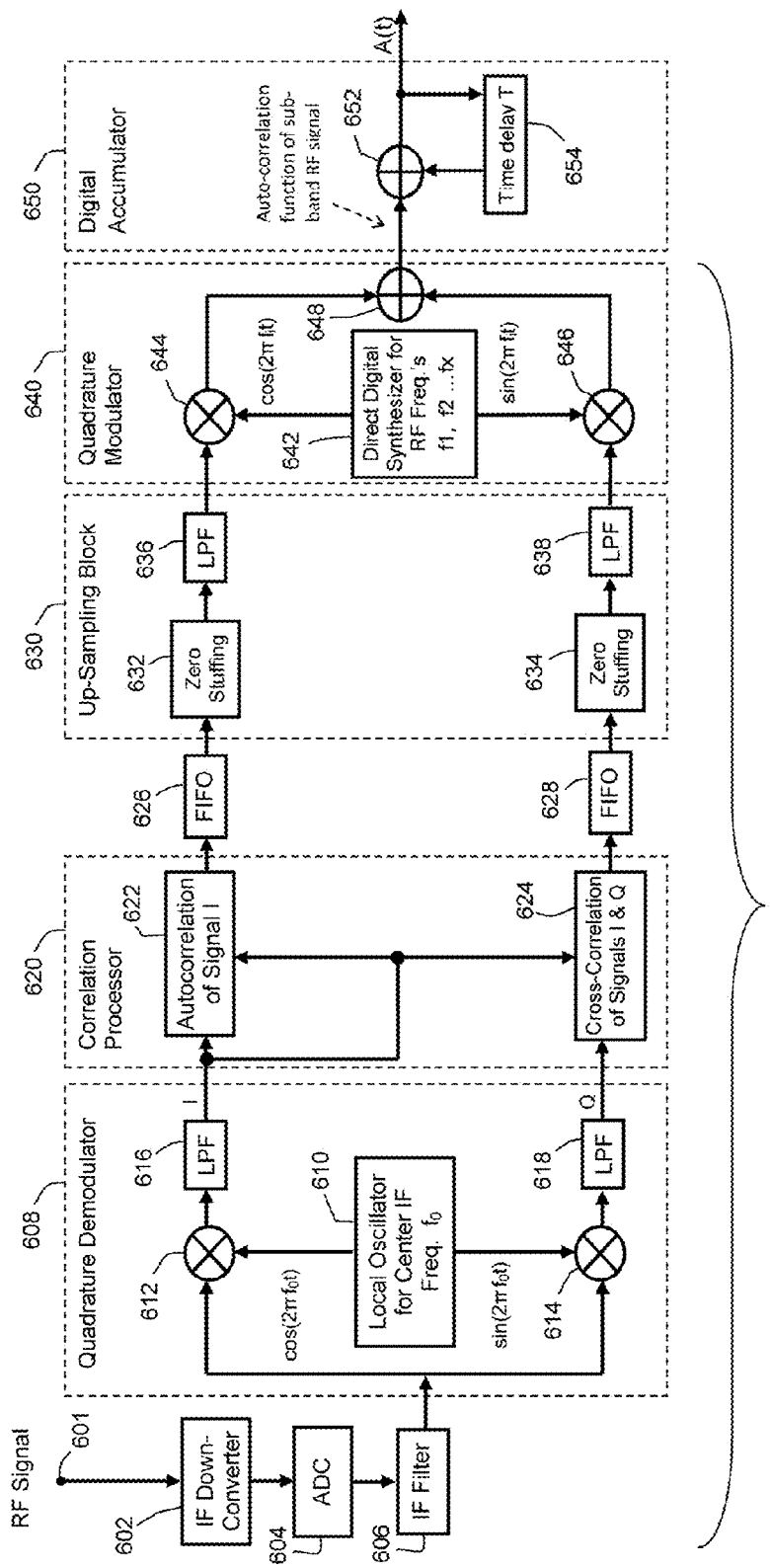
FIG. 6 is a block diagram of an autocorrelation processor tunable across multiple sub-bands and including an accumulator for accumulating autocorrelation functions of the sub-bands.

Consistent with the above general description, a block diagram of a tunable autocorrelation processor 600 is shown in FIG. 6. Processor 600 is employed to detect and locate linear impairments in a coaxial cable plant of an HFC network. An input 601 of processor 600 is coupled to the coaxial cable plant using, e.g., a T-connection or T-probe. The coaxial cable plant (or a section of the plant) to be tested is considered the cable under test. A sampling of an RF signal transmitted down the coaxial cable plant is received by a tunable IF down-converter 602 via input 601. The RF signal may be a downstream cable television signal containing, e.g., a number of QAM channels and an OFDM signal. Down-converter 602 is a tunable receiver that tunes to a particular sub-band of the spectrum of the RF signal and down-converts the signal of that sub-band to an intermediate frequency (IF). In the case of the aforementioned downstream cable television signal, the sub-band may be defined to be, e.g., a QAM channel band. Down-converter 602 is controlled by a programmed processor to sequentially tune to multiple sub-bands (e.g., multiple contiguous sub-bands) of the RF signal spectrum or a selected portion thereof. The signal of each RF sub-band is down-converted to an IF by down-converter 602 to produce a sequence of IF signals, where each IF signal represents a different RF sub-band. The IF signals are then converted, in sequence, to digital form by analog-to-digital converter (ADC) 604. The digital output (i.e., digital IF signal) from ADC 604 is filtered by a digital IF filter 606. Filter 606 may be designed or adapted to reject continuous pilot subcarriers of an OFDM signal and/or CW or narrowband signals within a selected spectrum of QAM and OFDM channels. It is possible to convert the RF downstream signal directly to I and Q baseband signals. But, as explained below, an IF stage makes it easier to implement a spectrum analyzer function and to reject OFDM continuous pilot subcarriers.

Again referring to FIG. 6, the filtered digital IF signal from filter 606 (for each sub-band) is received in a quadrature demodulator 608, where the signal is converted to in-phase (I) and quadrature (Q) baseband signals. The details of demodulator 608 are well-known, containing a dual-phase local oscillator (LO) 610, multipliers 612, 614 for the I and Q channels, and lowpass filters (LPF) 616 and 618 for I and Q demodulated signals, respectively. The lowpass filtered signals at the output of filters 616, 618 are the I and Q baseband signals, which are received by a correlation processor 620, via I and Q inputs. Processor 620 includes an autocorrelation processor 622 for the I baseband signal and a cross-correlation processor 624 for the I & Q baseband signals. As shown, the I baseband signal is received by processor 622 at a first input and the Q baseband signal is received by processor 624 at a first input. Processor 622 also receives the I baseband signal at a second input to achieve the autocorrelation of the I baseband signal. Processor 624 also receives the I baseband signal at a second input to achieve the cross-correlation of the I & Q signals. The outputs (baseband correlation functions) of processor 622 and processor 624 are received by a pair of first-in-first-out (FIFO) memory units 626 and 628, respectively.

FIFO memory units 626, 628 are used in conjunction with a virtual up-sampling stage or process step 630. Up-sampling of the correlation function signals is performed because the correlation functions are calculated at baseband using a relatively low sampling rate. Generally, the sampling rate used for quadrature modulation (next step—stage 640), should be the same as the sampling rate for the RF signal. However, virtual up-sampling can be achieved using the baseband clock rate and placing extra interpolation samples in between the correlation function samples calculated in processor 620. FIFO memory units 626, 628 are used to expand in time the correlation function signals from processor 620. For example, if processor 620 used a sampling rate of 40 MHz, and one wished to up-sample to 2000 MHz (i.e., times 50), then the signal data from FIFO memory 626, 628 should be sampled at a rate of 40/50=0.8 MHz. In up-sampling stage 630, zero stuffing or padding is performed in both channels, as represented by blocks 632 and 634. Zero samples are stuffed or padded at a clock rate of 40 MHz between the samples received from FIFO memory 626, 628 (at 0.8 MHz). The result undergoes interpolation or lowpass filtering in lowpass filters (LPFs) 636 & 638. In other words, typical digital signal processing up-sampling is performed between FIFO memory 626, 628 and up-sampling stage 630. The up-sampled and filtered signal samples are then received by a quadrature modulator stage 640.

Quadrature modulator 640 includes a direct digital synthesizer (DDS) 642, multipliers 644, 646 and a combiner 648. DDS 642 forms "virtual" (due to virtual up-sampling) RF frequencies f1, f2, f3 ... fx−1, fx (i=1→x), corresponding to the RF center frequencies of the sub-bands (e.g., QAM channels) of the downstream signal. The virtual frequencies are less than the actual RF frequencies, as in the operation of many oscilloscopes. For example, an actual QAM RF center frequency may be 800 MHz and a corresponding virtual frequency may be 100 MHz or 25 MHz. The up-sampled autocorrelation function from LPF 636 is multiplied by the DDS signal $\cos(2\pi fit)$ to produce an in-phase (I) up-converted auto-correlation output signal $AI(t)\cos(2\pi fit)$. The up-sampled cross-correlation function from LPF 638 is multiplied by the DDS signal $\sin(2\pi fit)$ to produce a quadrature (Q) up-converted cross-correlation output signal $AIQ\sin(2\pi fit)$. Signals $AI(t)\cos(2\pi fit)$ and $AIQ\sin(2\pi fit)$ are summed together in a summer 648 (corresponding to equation (2)) to produce an autocorrelation function $A(t)i$ corresponding to an RF sub-band (i.e., $A(t)i$ is the autocorrelation function of a virtual RF sub-band), such as plots 506 in FIG. 5. The phases of DDS signals $\cos(2\pi fit)$ and $\sin(2\pi fit)$ must be equal to zero for the zero time delay samples of the autocorrelation function calculated in processor 622. In other words, the signal $\cos(2\pi fit)$ must be at a maximum at the maximum point of the autocorrelation function of the I baseband signal.

The autocorrelation functions $A(t)i$, (i=1→x), are presented at an output of summer 648 and are serially received in a digital accumulator 650. Accumulator 650 includes a summer 652 and a delay line 654 having a delay period T. As shown in FIG. 6, accumulator 650 is a recursive implementation compared to the alternative parallel implementation shown in FIG. 5. The autocorrelation functions $A(t)i$ are combined in summer 652 during an accumulation time T*X, where X is the number of sub-bands within the selected RF signal band and T is the calculation time of the correlation functions for one sub-band. After period T*X, the autocorrelation function A(t) of the RF signal of the selected sub-bands is formed and presented at the output of digital accumulator 650 (at virtual RF frequency).

As now understood, the resulting autocorrelation function A(t) is formed at a low clock rate (e.g., 40 MHz), but the number of samples of the autocorrelation function will be much greater than a baseband version due to up-sampling. For example, if the maximum propagation time of a reflected signal in an HFC network is 4 microseconds (which corresponds to a distance of about 1500 feet between two adjacent amplifiers), then the number of samples of the signals at the output of correlation processor 620 will be 4×40 MHz=160 (if 40 MHz clock is used). But, after up-sampling to 2000 MHz the number of samples is increased to 160×50=8000, which relates to a propagation time measurable in the resulting autocorrelation function A(t) of 4 microseconds/8000=0.5 nanoseconds (i.e., time resolution). It should be noted that the above-described implementation of processor 600 (and associated signal-processing algorithm) does not require expensive chipsets due to the low sampling rate, yet it provides very good frequency selectivity for filtering out unwanted pilot carriers and other CW or narrowband signals and for selecting only random signals from the HFC downstream signal. To be clear, the 4 microseconds referred to herein is a roundtrip time between a test point and a mismatch (or other linear impairment). A signal propagates at about 300 meters per microsecond in free space, so 300×4 microseconds×0.87 (cable velocity coefficient)=1044 meters or approximately 3425 feet. Thus, the one-way distance represented by the 4 microseconds is 1712.5 feet (or about 1500 feet).

Figure 7:
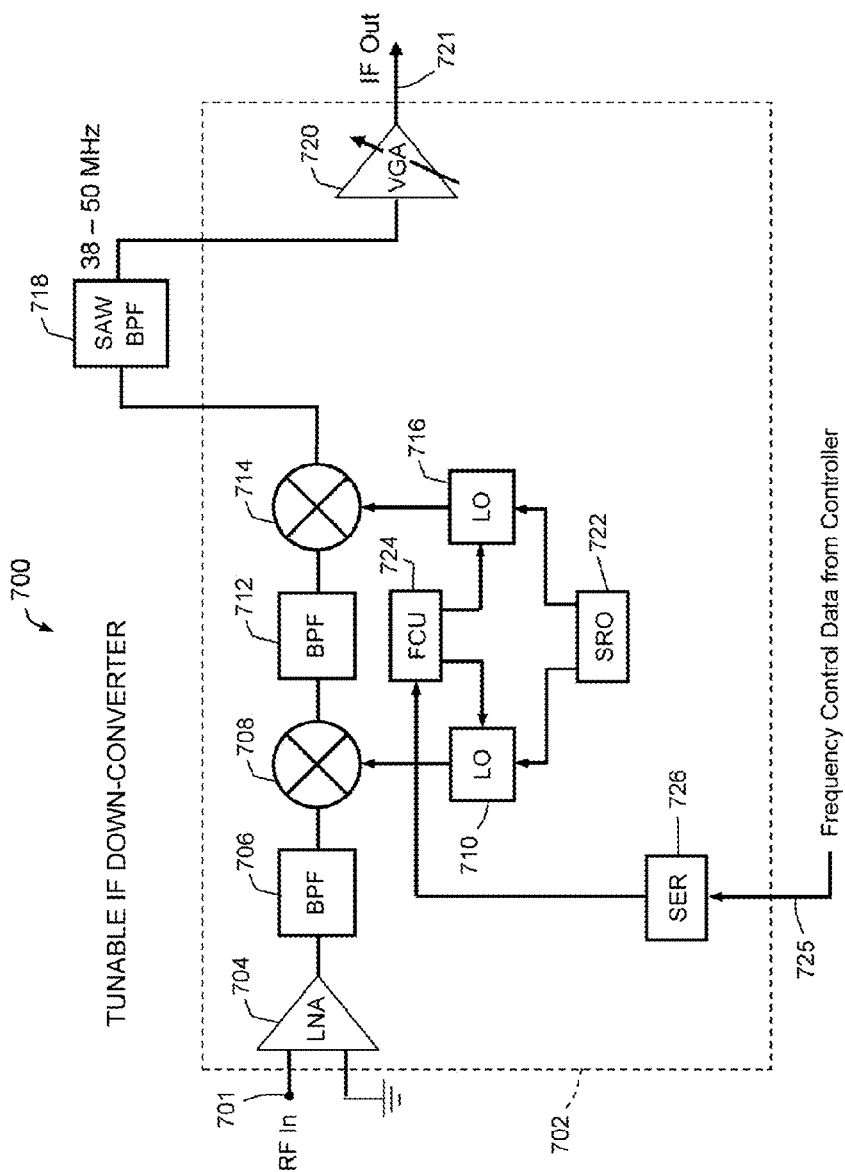
FIG. 7 is a block diagram of a tunable IF down-converter used in the autocorrelation processor of FIG. 6.

Referring now to FIG. 7, there is shown a block diagram of a tunable IF down-converter 700, which is shown as a general block in FIG. 6 (block 602). Tunable down-converter 700 is also referred to herein as a tunable receiver or a tuner. Down-converter 700 includes an RF input 701 for receiving the RF signal or downstream signal from a T-connection or T-probe connected to the cable under test (e.g., a coaxial cable plant in an HFC network). Down-converter 700 is preferably implemented using an inexpensive and readily available broadband receiver or tuner chip 702, such as, e.g., the MT2068 Single-Chip Broadband Tuner, supplied by Microtune, Inc., Plano, Tex. Receiver chip 702 includes a broadband low noise amplifier (LNA) 704, which receives and amplifies the RF signal. The amplified RF signal from LNA 704 is then filtered by a bandpass filter (BPF) 706 to eliminate any signals outside of the desired RF spectrum. The bandpass-filtered RF signal is then up-converted to a high internal first IF (e.g., 1.3 GHz) by a first mixer 708. A first voltage-controlled local oscillator (LO) 710 provides a mixing signal at a particular LO frequency for centering or shifting a particular sub-band of the RF signal (e.g., a particular QAM channel) within the first IF passband (i.e., tuning to a particular sub-band). A BPF 712 band limits the up-converted signal to a pre-set IF bandwidth ("first IF signal"). The first IF signal is then down-converted to a final IF (e.g., 44 MHz) by a second mixer 714. A second voltage-controlled LO 716 provides a mixing signal at a pre-set or fixed LO frequency to achieve the down-conversion of the first IF signal to the final IF. This is a classical scheme for IF down-conversion in a broadband tuner. The output of mixer 714 is presented at an output pin of chip 702. A SAW bandpass filter 718 is connected to the output pin and thus receives the output of mixer 714. SAW filter 718 band limits the signal from mixer 714 within a sharply defined, preferred 12 MHz bandwidth (e.g., 38-50 MHz). The output of SAW filter 718 enters chip 702 through an input pin and is coupled to an input of a variable-gain amplifier 720. The output of amp 720 is the desired IF signal at the desired output level, and is presented at an output 721 of down-converter 700 (equivalent to the output of IF down-converter 602 in FIG. 6).

Again referring to FIG. 7, LO 710 and LO 716 are synchronized by a common system reference oscillator (SRO) 722, which derives its fundamental frequency from a 16 MHz crystal (not shown). The frequencies of LOs 710 and 716 are controlled by a frequency control unit (FCU) 724, which, in turn, is controlled by frequency control data delivered to FCU 724 from a serial-control interface (SER) 726. The frequency control data originates from a programmed processor and controller (e.g., see FIG. 9; 924 & 926), and enters chip 702 (as serial data) through a serial data input pin 725. The data instructs FCU 724 to change the frequency of LO 710, to tune from one sub-band (QAM channel) to the next, in a serial operation. As will be explained further below, an operator of a tunable autocorrelation processor of the present invention will have an opportunity to select a portion of the full RF signal spectrum (random signals) to be down-converted and processed (e.g., only QAM channels in the 500-860 MHz band). In making this selection, the operator (or a computer program) specifies a minimum and maximum limit of the selected band (then divided into sub-bands). This information is also conveyed as frequency control data to FCU 724 to define the start and stop limits of the serial sub-band tuning operation.

Figure 8:
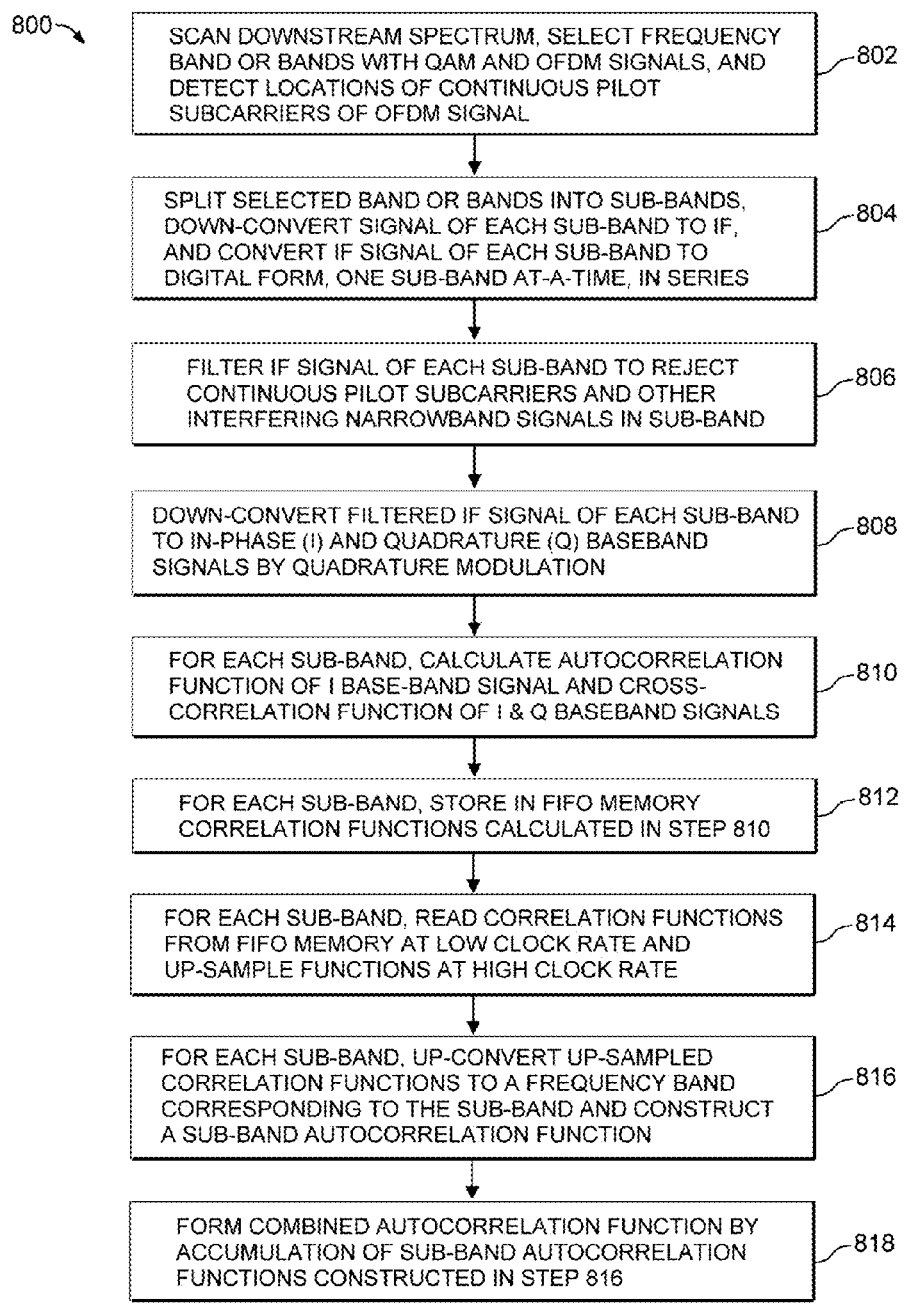
FIG. 8 is a flow diagram outlining a method of the present invention for carrying out P-TDR measurements in an HFC network.

Referring to FIG. 8, there is shown a flow diagram outlining a method or signal processing algorithm 800 for P-TDR measurements in an HFC network, in accordance with the present invention. In a first step 802, the spectrum of a downstream signal containing QAM and OFDM signals is scanned, and the frequency band or bands of the QAM and OFDM signals are identified and selected. Also, the locations of the continuous pilot subcarriers in the OFDM signal are detected for filter rejection. The QAM signals and the data subcarriers of the OFDM signals are used collectively as a random TDR probe signal. In a second step 804, the frequency band or bands selected in step 802 are split into a plurality of sub-bands, and the signal of each sub-band is down-converted to IF (e.g., block 904 in FIG. 9), one sub-band at-a-time, in series. The IF signal of each sub-band is then converted to digital data by an analog-to-digital converter (e.g., block 906 in FIG. 9). In a third step 806, the IF signal of each sub-band is filtered (e.g., block 908 in FIG. 9) to reject any continuous pilot subcarriers and any other interfering narrowband signals in the sub-band. In a fourth step 808, the filtered IF signal of each sub-band is down-converted to in-phase (I) and quadrature (Q) baseband signals by quadrature demodulation (e.g., block 910 in FIG. 9). In a fifth step 810, the autocorrelation function of the I baseband signal is calculated and the cross-correlation function of the I and Q baseband signals is calculated, for each sub-band (e.g., block 912 in FIG. 9). In a sixth step 812, the correlation functions calculated in step 810 for each sub-band are stored in FIFO memory (e.g., block 914 in FIG. 9). In a seventh step 814, for each sub-band, the correlation functions are read from the FIFO memory at a very low clock rate (0.8 MHz) and the functions are virtually up-sampled at a higher (40 MHz) clock rate (e.g., block 916 in FIG. 9). In an eighth step 816, the up-sampled autocorrelation function of the I baseband signal and the up-sampled cross-correlation function of the I and Q baseband signals are up-converted by quadrature modulation to a frequency band corresponding to the original RF frequency of the sub-band (e.g., a virtual RF sub-band frequency). Then, the up-converted, up-sampled autocorrelation and cross-correlation functions are added together to construct a sub-band autocorrelation function, in accordance with equation (2) (e.g., block 918 in FIG. 9 or block 640 in FIG. 6). Step 816 is performed for each sub-band. In a ninth and final step 818, a combined autocorrelation function (A(t)) is constructed by an accumulation of the sub-band autocorrelation functions (e.g., block 920 in FIG. 9). The combined autocorrelation function A(t) corresponds closely to an autocorrelation function of the combined RF QAM signals and OFDM data subcarriers of the plurality of sub-bands.

Figure 9:
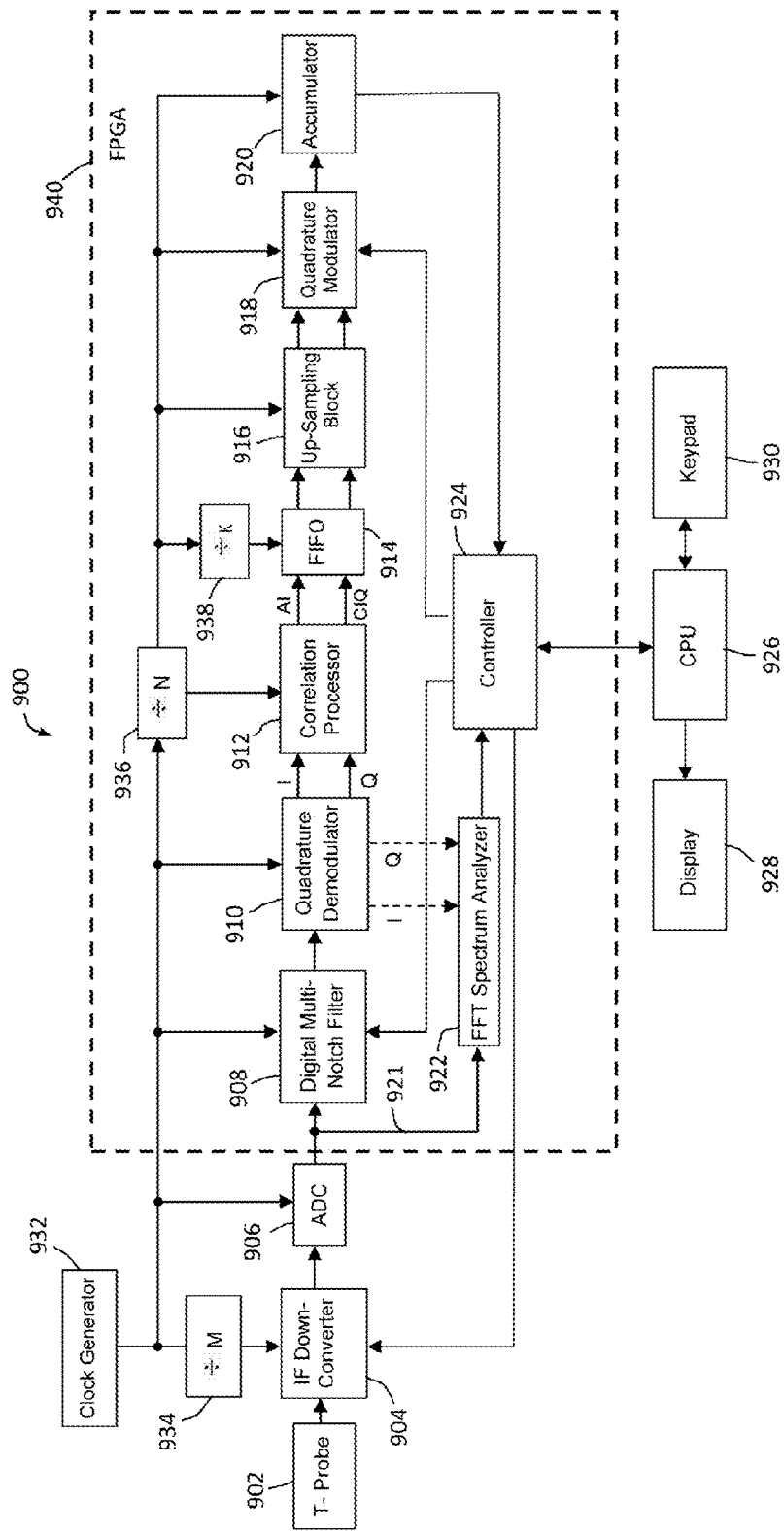
FIG. 9 is a block diagram of a preferred embodiment of a low-cost P-TDR meter, constructed in accordance with the present invention.

Referring to FIG. 9, there is shown a preferred embodiment of a low-cost P-TDR meter 900, constructed in accordance with the present invention. As suggested by the references made above, meter 900 operates in accordance with method 800. Meter 900 is a light-weight, portable device to be conveniently carried by a cable technician in the field. It is designed to be coupled to the coaxial cable portion of an HFC network using a T-connection or preferably a T-probe 902. Specifically, T-probe 902 connects meter 900 to any available or technician-created test point along the coaxial plant (e.g., a test port associated with an amplifier or a seizure screw port). The meaning of the term "test point" in this specification includes pre-established test points and those created by a technician to gain access to the downstream and/or upstream signals of an HFC network. T-probe 902 is a known device used in the cable television industry (e.g., see QTP-20 Test Probe, supplied by Arcom Digital, LLC, Syracuse, N.Y., http://www.arcomlabs.com/images/documents/quiver_sell_sheet.pdf). T-probe 902 taps the whole RF downstream signal from the HFC network and directs it to an IF down-converter 904.

A clock generator 932 generates a stable clock signal and is used as a common master clock. The clock signal is divided down at a frequency divider 934 for down-converter 904 and at dividers 936 and 938 inside a field programmable gate array (FPGA) 940. The undivided clock signal is applied directly to an analog-to-digital converter (ADC) 906, a digital multi-notch filter 908, and a quadrature demodulator (Q-demodulator) 910. A common clock is used to achieve coherent construction of an autocorrelation function of a selected and filtered portion of the RF downstream signal. As an example, the master clock may be selected to be 160 MHz for digitizing (in ADC 906) the IF signal, which may be centered at 44 MHz. In choosing the bandwidth of IF down-converter 904, it should be an integer number of the 6 MHz QAM channels (e.g., 12 MHz). If the center frequency of the IF band is 44 MHz, a SAW bandpass filter with a 12 MHz bandwidth (in the output of down-converter 904) will have good band selectivity and will also be inexpensive. The SAW filter is used to reject image harmonics created from down-conversion.

Down-converter 904 down-converts the RF downstream signal one sub-band at-a-time under the control of a controller 924 and a programmable processor or computer (CPU) 926. The signal of each down-converted sub-band of the downstream signal ("IF sub-band signal") is analog-to-digitally converted in an ADC 906 to create IF signal data (or samples). The IF signal data for each sub-band is delivered to an FFT spectrum analyzer 922, via a data bus 921. Spectrum analyzer 922 converts the IF signal data to the frequency domain, to produce signal spectrum data. The signal spectrum data is then delivered to CPU 926, via controller 924. The signal spectrum data of all the sub-bands are assembled together by CPU 926 to create a composite spectrum of the whole downstream signal. Associated with CPU 926 is an output device such as a display screen 928 and an input device such as keypad 930. A technician can activate FFT spectrum analyzer 922 through keypad 930, to acquire the spectrum data and cause the full downstream signal spectrum to be assembled and displayed on display screen 928. CPU 926 is programmed to run a user interface that allows the user to interact with the displayed downstream spectrum. The technician can use keypad 930 to select the minimum (min) and maximum (max) frequencies of the RF downstream spectrum containing QAM and OFDM signals. Some analog channels may be present in the selected min to max band of frequencies. CPU 926 (in cooperation with FFT analyzer 922) automatically analyzes the selected band (between min and max) and locates the narrowband carriers like analog video and audio carriers. AGC pilots and OFDM continuous pilot subcarriers. Thus far, meter 900 has performed step 802 of method 800 in FIG. 8.

After the min to max band (or bands) of the downstream signal has been selected and the narrowband signals have been detected and located, the technician pushes a button that puts meter 900 into a "TDR mode." Down-converter 904 then down-converts the selected RF downstream min to max band or bands, one sub-band at-a-time (in series), under the control of controller 924 and CPU 926. The sub-bands are logical divisions of the selected min to max band or bands, such as QAM channel bands (6 MHz sub-bands). As before, the IF signals of the (selected) sub-bands are analog-to-digitally converted to IF signal data (or samples) by ADC 906. At this point, meter 900 has performed step 804 of method 800 in FIG. 8. The digital IF signal data samples are then received in a digital multi-notch filter 908, which has been automatically adaptively configured (or user pre-configured) to reject or suppress the unwanted narrowband signals (e.g., OFDM pilot subcarriers, analog video & audio carriers, AGC pilots, etc.) from the data (step 806 in FIG. 8). CPU 926 and controller 924 have previously configured or reconfigured filter 908 based on the detection and location of unwanted narrowband signals in the initial step described above (step 802). The filtered digital IF signal data is then down-converted to I and Q baseband signals by Q-demodulator 910 (step 808 in FIG. 8). Q-demodulator 910 includes a first set of I and Q outputs that connect to a correlation processor 912 and a second set of I and Q outputs that connect to FFT spectrum analyzer 922. Correlation processor 912 creates the autocorrelation of the I baseband signal and the cross-correlation of the I and Q baseband signals (i.e., baseband versions of the addends on the right side of equation (2)). The correlation functions are created with a clock rate that is equal to the master rate divided by N. The clock rate is divided down by divider 936. As an example, if N=4, then the clock rate for processor 912 would be 40 MHz. The function of correlation processor 912 is as described with respect to block 620 in FIG. 6. Processor 912 carries out step 810 in FIG. 8. The autocorrelation and cross-correlation outputs of processor 912 are then individually stored in FIFO memory 914 (step 812 in FIG. 8), to support up-sampling in up-sampling block 916 (see FIG. 6, blocks 626, 628 & 630, and related discussion).

As indicated in FIG. 9, FIFO memory 914 is clocked at a different (much lower) rate than processor 912 or up-sampling block 916. The clock rate from divider 936 is divided by K in divider 938. As an example, if N=4 and K=50, then the clock rate for FIFO memory 914 would be 0.8 MHz (or 160 MHz/4/50=0.8 MHz). As explained in connection with FIG. 6 (blocks 626. 628 & 630), the very low clock rate of 0.8 MHz is used to up-sample to 2000 MHz or 50 times the 40 MHz clock rate. Again referring to FIG. 9, up-sampling processor 916 is clocked at the intermediate clock rate from divider 936 (e.g. 40 MHz). Processor 916 is preferably configured and functions as previously described with respect to block 630 in FIG. 6. The autocorrelation and cross-correlation data are individually up-sampled to, for example, 2000 MHz, and then lowpass filtered (step 814 in FIG. 8). The up-sampled data is received in a quadrature modulator (Q-modulator) 918, which is clocked at the intermediate clock rate from divider 936 (e.g. 40 MHz). The up-sampled correlation functions for each sub-band are up-converted to virtual RF sub-band frequencies and then a virtual RF autocorrelation function A(t) (see equation (2)) of each sub-band is constructed (in series) by Q-modulator 918 (step 816 in FIG. 8). Q-modulator 918 is preferably configured and functions as previously described with respect to block 640 in FIG. 6. The virtual RF autocorrelation function A(t) of each virtual RF sub-band is received, in series, in a digital accumulator 920. The autocorrelation function of the selected and filtered RF downstream signal (i.e., the selected sub-bands) is constructed by accumulation of the virtual RF autocorrelation functions of the individual sub-band signals (step 818 in FIG. 8). Accumulator 920 is clocked at the intermediate clock rate generated by divider 936. Accumulator 920 is preferably configured and functions as previously described with respect to block 650 in FIG. 6.

As indicated by a dash-line block in FIG. 9, digital multi-notch filter 908, Q-demodulator 910, correlation processor 912, FIFO memory 914, up-sampling block 916, Q-modulator 918, accumulator 920, FFT spectrum analyzer 922, controller 924, and frequency dividers 936 and 938 are all implemented in FPGA 940. CPU 926 interfaces with FPGA 940 (especially FFT spectrum analyzer 922) through controller 924.

The process of detecting and locating OFDM continuous pilot subcarriers, analog video and audio carriers, AGC pilot carriers, etc., from the IF signal data is now described further here. FFT spectrum analyzer 922 receives the IF signal data from ADC 906 and converts it to spectrum data (first set of spectrum data). The IF signal data from ADC 906 is clocked at the master clock rate (e.g., 160 MHz). The RBW of analyzer 922 should be about 100 kHz to produce spectrum data sufficient to detect analog carriers and AGC pilots. Thus, if the master clock is 160 MHz, the IF signal data samples are adequate to carryout a 2K FFT mode, and a 2K FFT mode is sufficient for the detection of the analog carriers and AGC pilots. This conclusion is based on the following: RBW=160 MHz/2048 points (2K)=0.078 MHz or about 100 kHz). However, a 100 kHz RBW is not sufficient to detect the continuous pilot subcarriers of an OFDM signal. When FFT analyzer 922 detects OFDM signal data from ADC 906, it retrieves samples of the I and Q baseband signals from Q-demodulator 910. At this stage (step 802), digital filter 908 has an open passband with no notches established. Analyzer 922 then performs an FFT on the I and Q baseband signals that represent the OFDM signal (second set of spectrum data), and the FFT is performed at a slow sampling clock rate. In the case of a 12 MHz IF bandwidth, the sampling clock rate of the FFT may be 12

MHz. At this rate, the FFT mode should be about 8K or 16K, minimum, to detect the OFDM continuous pilot subcarriers, with a desired RBW for analyzer 922 of about 1 kHz. After FFT analyzer 922 has prepared the first and second sets of spectrum data, both sets are analyzed by CPU 926 to detect and locate the frequencies of the OFDM continuous pilot subcarriers, analog video and audio carriers, and AGC pilot carriers, etc.

Digital multi-notch filter 908, used for rejection of undesired narrowband signals, is easily implemented in accordance with well-known comb filter designs (see, e.g., http://en.wikipedia.org/wiki/Comb_filter; Sugiura, Y. et al., A Comb Filter with Adaptive Notch Gain for Periodic Noise Reduction, October 2012, IEEE Proceedings, Signal & Information Processing Association Annual Summit and Conference (APSIPA ASC), 2012 Asia-Pacific, www.apsipa.org/proceedings_2012/papers/37.pdf; Cyrill, D. et al., Adaptive Comb Filter for Quasi-Periodic Physiologic Signals, 2003 Proceedings Of The 25th Annual EMBS International Conference, Sep. 17-21, 2003, Cancun, Mexico, pp. 2439-42, bsp.pdx.edu/Publications/-2003/CyrillEMBS.pdf). Generally, the comb filter includes a time delay line and an adder. Obviously, the autocorrelation function of the signal filtered by filter 908 will have an extra undesired peak corresponding to the delayed signal from the time delay line associated with the filter. However, if the time delay is selected to be more than the expected interval of time delays of the reflected signals in the P-TDR measurement, then the peak due to the filter time delay will not interfere with the P-TDR measurement. For example, the maximum time delay between adjacent amplifiers in an HFC network is about 4 microseconds or about 1,500 feet. So, if the time delay line of digital comb filter 908 is about 5 microseconds, then the extra peak in the autocorrelation function of the signal after filter 908 will not interfere with the P-TDR measurement.

A calculation is now described for determining a time interval for estimating an autocorrelation function of a selected and filtered RF signal within the band of, e.g., 500-860 MHz. The 500-860 MHz band is typically occupied by QAM signals in current HFC networks in the United States. The bandwidth of the selected RF signal is 360 MHz (860-500), which provides a time resolution for reflected signals of about 3 nanoseconds or approximately one foot. This resolution should be sufficient for accurate location of impedance mismatches in the coaxial plant of the HFC network. The 360 MHz bandwidth should preferably be split into 30 sub-bands of 12 MHz each (i.e., the IF bandwidth). If the master clock is 160 MHz, a 40 MHz intermediate clock (N=4 at divider 936) is suitable for correlation processor 912. Up-sampling to an RF band should be accomplished with a clock of more than the Nyquist frequency (860×2=1720 MHz). If 2560 MHz is selected, then: 64×40 MHz=2560 MHz. So, divider 938 (FIG. 9) should have a value of K=64. Also, suppose that the accumulation time for estimating the autocorrelation function is 10 milliseconds in an ideal matched filter. Further, suppose that the maximum time delay of a reflected signal is 4 microseconds (one-way distance of more than 1500 feet in coaxial cable with relative propagation velocity of 0.87). The time needed to calculate the autocorrelation function of one sub-band will be T=accumulation time for estimating autocorrelation function in ideal matched filter plus calculation time interval. For example, if matched filter accumulation time is 10 ms and maximum roundtrip time interval is 4 microseconds, than the time of calculation will be 10 ms+0.004 ms=10.004 ms. In other words, the first (time delay=0) sample of the auto-correlation function will appear after 10 ms and the last sample will appear after the next 4 microseconds. In the case of the above-described virtual up-sampling, the last sample of the auto-correlation function will appear after 10 ms plus 4×64, where 64 is coefficient of up-sampling. Thus, with the above parameters, T=10 milliseconds+(4 microseconds×64)=10.256 milliseconds. For 30 sub-bands, the total accumulation time will be 30×10.256=0.308 seconds, instead of 10 milliseconds of accumulation performed by an ideal matched filter (as in FIG. 3). In accordance with this example, meter 900 would take about 0.3 seconds to calculate the autocorrelation function compared to 10 milliseconds for an ideal matched filter. Obviously, the expense of reduced speed is worth the significant reduction in complexity of hardware and the achievement of excellent frequency selectivity. The cost and power consumption of meter 900 is also very low compared with other solutions. In addition, meter 900 can be easy implemented in a small handheld package.

Figure 10:
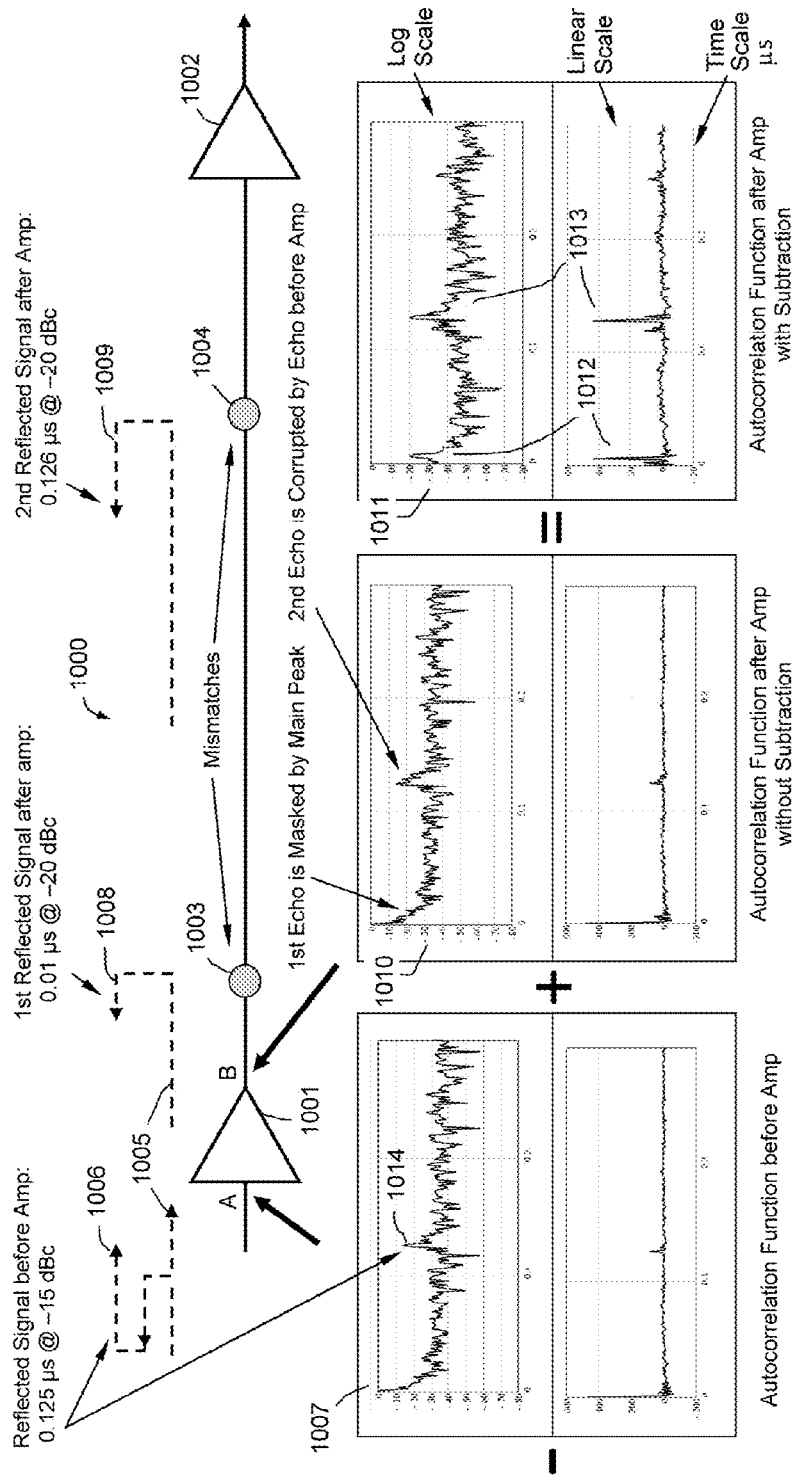
FIG. 10 is a cable plant diagram illustrating a scenario of a reflection occurring upstream of an amplifier while performing P-TDR downstream of the amplifier, and showing emulation results of a method of the present invention for compensating for the upstream reflection.

In an HFC network, the coaxial plant, or a branch of the plant, is divided by cascaded amplifiers along with passive network devices (see FIG. 10). Generally, a P-TDR meter can only be used in a section of coaxial cable between two amplifiers, because the reflected downstream signal cannot pass through the diplex filter of a bi-directional amplifier. But, the downstream signal may already have a reflected signal combined with it at the input of an amplifier due to a mismatch located upstream of the amplifier. This scenario is illustrated in FIG. 10. FIG. 10 shows a coaxial cable plant 1000, including first and second amplifiers 1001 and 1002 and first and second taps 1003 and 1004. A section of coaxial cable between amplifiers (such as amps 1001 and 1002), containing passive elements (such as taps 1003 and 1004), is referred to as a "passive section". A downstream signal 1005 is combined with a reflected signal 1006 caused by a mismatch located upstream from amplifier 1001 ("upstream mismatch"). An autocorrelation function 1007 of the combined signal has an extra peak 1014, corresponding to reflected signal 1006 (and the upstream mismatch). So, if a P-TDR meter is connected between amplifiers 1001 and 1002, and there are no mismatches after amplifier 1001, peak 1014 will be detected falsely as a reflection occurring after amplifier 1001 ("false peak"). Another problem is that a sidelobe of a main autocorrelation peak can mask a peak corresponding to a reflected signal occurring at short distances from the P-TDR connection point ("masking sidelobe"). To overcome these problems, the present invention includes a method of compensating for false peaks and masking sidelobes (referred to herein as "measurement interference") in autocorrelation functions. The method is outlined in the flow diagram of FIG. 11.

Figure 11:
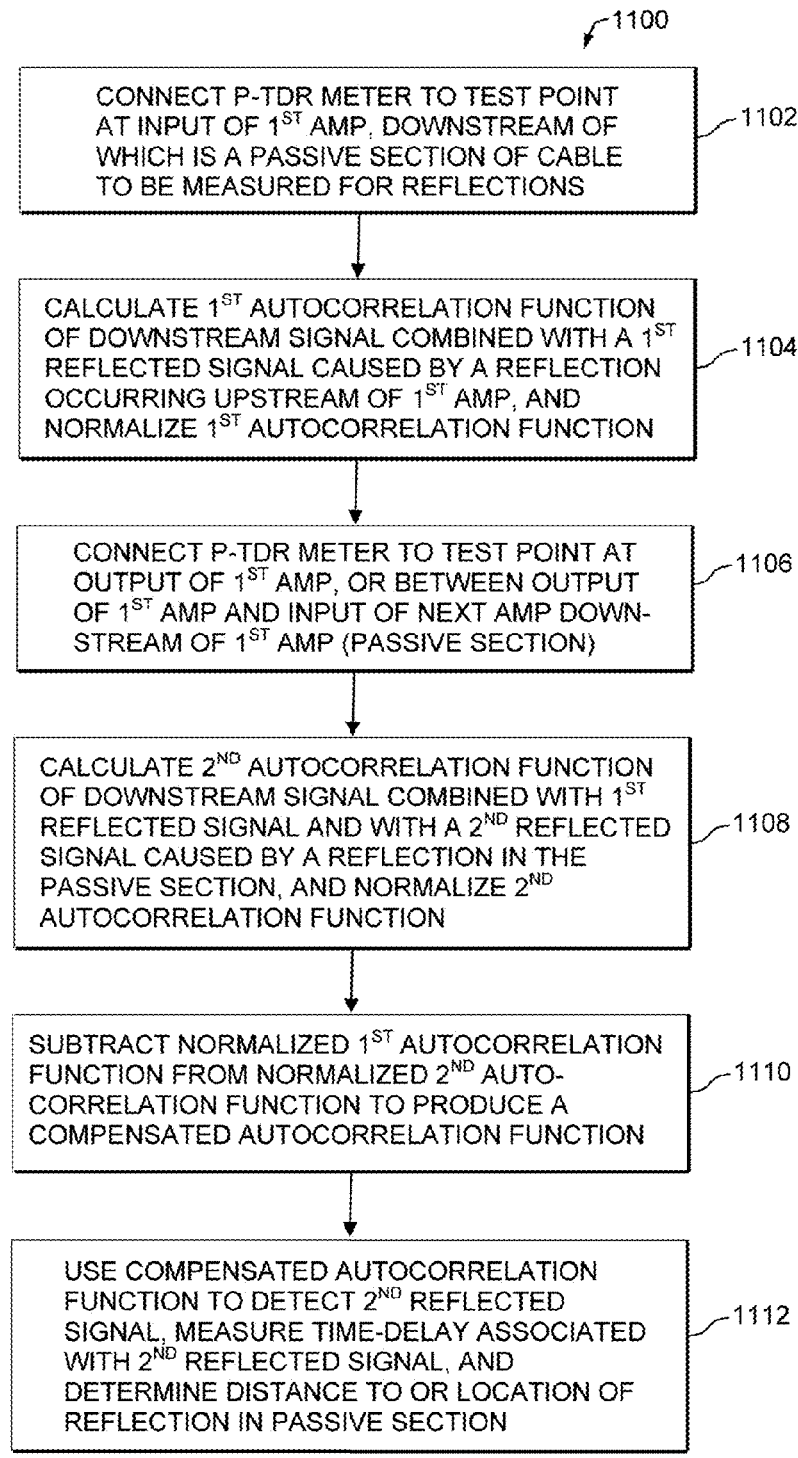
FIG. 11 is a flow diagram outlining a method of the present invention of compensating for reflections occurring upstream of an amplifier, while performing P-TDR downstream of the amplifier.

Referring to FIG. 11, a method 1100 of canceling measurement interference (e.g., false peaks and/or masking sidelobes) will now be described, reference also being made to FIG. 10. In a first step 1102 (FIG. 11), a P-TDR meter is connected to a test point "A" at or near the input of amp 1001 (FIG. 10). Test point A may be a forward path test point inside amp 1001. The P-TDR receives downstream signal 1005 combined with reflected signal 1006. A passive section of coaxial plant 1000 between amps 1001 and 1002 contains only passive network devices (taps 1003 and 1004). The passive section is to be tested for mismatches using the P-TDR meter. In a second step 1104, the P-TDR meter calculates a first autocorrelation function of downstream signal 1005 combined with reflected signal 1006, normalizes the first autocorrelation function (1007 in FIG. 10), and then stores it in flash memory of, e.g., CPU 926 (FIG. 9). In a third step 1106, the P-TDR meter is connected to a test point "B" preferably at or near the output of amp 1001 (FIG. 10), but the test point could be anywhere in the passive section. At test point B, the P-TDR meter receives downstream signal 1005 combined with reflected signal 1006 and combined with reflected signals 1008 and 1009 (FIG. 10) generated in the passive section. Reflected signal 1008 is primarily a reflection of signal 1005 at a mismatch located at tap 1003, and reflected signal 1009 is primarily a reflection of signal 1005 at a mismatch located at tap 1004. In a fourth step 1108, the P-TDR meter calculates a second autocorrelation function of the downstream signal combined with reflected signals 1006, 1008 & 1009, and then normalizes the second autocorrelation function (1010 in FIG. 10). Normalized second autocorrelation function 1010 is then stored in flash memory of CPU 926 (FIG. 9).

As shown in FIG. 10, normalized function 1010 is plagued by two types of measurement interference. The first type concerns reflected signal 1008, which is generated close to test point B and produces a correlation peak (or spike) at 0.01 microseconds. However, this peak is masked in function 1010 by the main peak (or the sidelobes of the main peak) of function 1010. The second type interference concerns reflected signal 1009. Signal 1009 is generated at about the same distance from point B as reflected signal 1006 (in the opposite direction). And, correlation peak 1014 (associated with reflected signal 1006) is stronger than an expected correlation peak for reflected signal 1009 (see exemplary signal levels for signals 1006 & 1009 in FIG. 10). Thus, correlation peak 1014 obscures or corrupts the expected correlation peak for reflected signal 1009 in function 1010.

In a fifth step 1110, the normalized first autocorrelation function 1007 is subtracted from the normalized second autocorrelation function 1010, to produce a resultant or compensated autocorrelation function 1011 (FIG. 10). Function 1011 is substantially free from the measurement interference plaguing autocorrelation function 1010. Function 1011 includes correlation peaks 1012 and 1013 (FIG. 10), which are associated with reflected signals 1008 and 1009, respectively, and, accordingly, with the mismatches at taps 1003 and 1004, respectively. In a final or sixth step 1112, reflected signals 1008 & 1009 are detected from peaks 1012 and 1013 in function 1011. Peaks 1012 and 1013 are sufficiently revealed in compensated function 1011 to be detected ("detectably revealed"). In addition, a time delay is determined from the location of each peak 1012 and 1013 along the time scale of function 1011. The time delays represent the roundtrip propagation time of signal 1005 from test point B to mismatched taps 1003 & 1004 and of reflected signals 1008, 1009 back to point B. Further, in step 1112, the approximate distances of the mismatches (or reflection points) from point B are determined from the time delays and the velocity of propagation in cable plant 1000. Then, from the approximate distances, the locations of the mismatches can be found.

In method 1100, normalization of the autocorrelation functions 1007 and 1010 may be done in different ways, but the simplest way is to normalize to the amplitude of the main peak of the function. An alternative way of normalizing, where the gain of amp 1001 is known, is to normalize function 1010 relative to function 1007, by removing from function 1010 the contribution of the gain of amp 1001. For the purpose of the claims, the latter way of normalizing is considered as normalizing both autocorrelation functions 1007 and 1010, where function 1007 is normalized to itself and function 1010 is normalized to function 1007.

The plots in FIG. 10 show the results of an emulation of method 1100 for downstream signal 1005, comprising 60 QAM channels (360 MHz total bandwidth). As indicated in FIG. 10, reflected signal 1006 (upstream of amp 1001) has a level of −15 dBc and a time delay of 0.125 microseconds, reflected signal 1008 has a level of −20 dBc and a time delay of 0.01 microseconds (about 1.32 meters), and reflected signal 1009 has a level of −20 dBc and a time delay of 0.126 microseconds (about 16.632 meters). Plot 1007 shows the normalized first autocorrelation function of downstream signal 1005 sampled at test point A (before amp 1001). Plot 1007 contains correlation peak 1014, caused by reflected signal 1006. Plot 1010 shows the normalized second autocorrelation function of downstream signal 1005 sampled at test point B (after amp 1001). The second autocorrelation function is uncompensated and contains measurement interference obscuring the detection of reflected signals 1008 and 1009. An expected correlation peak associated with the mismatch at tap 1003 is masked by the main peak (left-most peak) or sidelobe of the main peak of function 1010. Also, a peak associated with the mismatch at tap 1004 has been corrupted by peak 1014 (of plot 1007). This occurs because the time delay associated with reflected signal 1006 (0.125 microseconds) is nearly the same as that associated with reflected signal 1009 (0.126 microseconds). Plot 1011 shows the compensated autocorrelation function after subtraction of function 1007 from function 1010, in accordance method 1100. The compensated function has a clearly visible peak 1012 located at about 0.01 microseconds (reflected signal 1008) and a clearly visible peak 1013 located at about 0.126 microseconds (reflected signal 1009). The effects of the main peak (or its sidelobes) and peak 1014 are canceled in function 1011. These peaks can easily be detected and their associated time delays (0.01 & 0.126 microseconds) can be accurately measured by the P-TDR meter of the present invention. Thus, the P-TDR meter of the present invention will be able to accurately range and locate the mismatches at taps 1003 and 1004.

The various functions of the present invention, as described above, may be implemented in hardware, firmware, software, or a combination of these. For example, with respect to hardware, these functions may be implemented in an application specific integrated circuit (ASIC), digital signal processor (DSP), field programmable gate array (FPGA), micro-controller, microprocessor, programmable logic device, general purpose computer, special purpose computer, other programmable electronic device, or a combination of these devices (hereinafter "processor"). If the various functions are implemented in firmware, software, or other computer-executable instructions, then they may be stored on any suitable computer-readable media. Computer-executable instructions may cause a processor and other associated hardware to perform the aforementioned functions of the present invention. Computer-executable instructions include data structures, objects, programs, routines, commands, or other program modules accessible and executable by a processor. The computer-readable media may be any available media accessible by a processor. Embodiments of the present invention may include one or more computer-readable media. Generally, computer-readable media include, but are not limited to, random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), flash memory, or any other device or component that is capable of providing data or executable instructions accessible by a processor. Certain embodiments recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What I claim is:

1. A time domain reflectometry apparatus for detecting a linear impairment in a cable under test carrying RF signals including random and unwanted narrowband signals in a downstream direction, the linear impairment causing a reflection of the RF signals in an upstream direction, said apparatus comprising:

(a) an input, to be coupled to the cable under test at a test point upstream from the linear impairment, for receiving the RF signals and the reflection of the RF signals as a received signal, the received signal having a frequency spectrum including a plurality of sub-bands at a plurality of RF frequencies, respectively, each of the sub-bands containing a part of the received signal as a sub-band signal;

(b) a tunable receiver, coupled to said input, for tuning to the plurality of sub-bands and receiving the sub-band signals, one sub-band at a time;

(c) a filter, coupled to said tunable receiver, for filtering the sub-band signals, one sub-band at a time, said filter adapting to each sub-band signal to substantially remove any unwanted narrowband signal from the sub-band signal to produce a filtered sub-band signal;

(d) an autocorrelation processor, coupled to said filter, for determining an autocorrelation function of each of the filtered sub-band signals, one sub-band at a time, to produce a plurality of sub-band autocorrelation functions;

(e) an accumulator, coupled to said autocorrelation processor, for combining the plurality of sub-band autocorrelation functions together to form a combined autocorrelation function; and (f) detection means, coupled to said accumulator, for detecting the reflection of the RF signals from the combined autocorrelation function.

2. The time domain reflectometry apparatus of claim 1, further comprising:

(g) time delay means, associated with said detection means, for determining from the combined autocorrelation function a time delay associated with the reflection of the RF signals and with the distance from the test point to the linear impairment.

3. The time domain reflectometry apparatus of claim 2, further comprising:

(h) means, associated with said time delay means, for determining the distance from the test point to the linear impairment based on the time delay determined by said time delay means.

4. The time domain reflectometry apparatus of claim 2, further comprising:

a spectrum analyzer, coupled to said tunable receiver, for analyzing each of the sub-band signals to identify unwanted narrowband signals therein, said filter being adapted to each sub-band signal substantially in response to the identification of unwanted narrowband signals by said spectrum analyzer.

5. The time domain reflectometry apparatus of claim 2, wherein said autocorrelation processor includes:

demodulator means, coupled to said filter, for generating in-phase and quadrature baseband signals of each filtered sub-band signal;

correlation means, coupled to the demodulator means, for performing an autocorrelation of the in-phase baseband signal to produce a baseband autocorrelation function and for performing a cross-correlation of the in-phase and the quadrature baseband signals to produce a baseband cross-correlation function, for each filtered sub-band signal;

modulator means, coupled to the correlation means, for up-converting the baseband autocorrelation function and the baseband cross-correlation function, for each filtered sub-band signal, to a frequency corresponding to the RF frequency of the sub-band associated with the baseband autocorrelation function and the baseband cross-correlation function; and combiner means, coupled to the modulator means, for combining the up-converted baseband autocorrelation function and the up-converted baseband cross-correlation function, for each filtered sub-band signal, to produce the plurality of sub-band autocorrelation functions.

6. The time domain reflectometry apparatus of claim 2, wherein said autocorrelation processor includes:

a demodulator, coupled to said filter, for generating in-phase and quadrature baseband signals of each filtered sub-band signal;

a correlation processor, coupled to the demodulator, for performing an autocorrelation of the in-phase baseband signal to produce a baseband autocorrelation function and for performing a cross-correlation of the in-phase and the quadrature baseband signals to produce a baseband cross-correlation function, for each filtered sub-band signal;

a modulator, coupled to the correlation processor, for up-converting the baseband autocorrelation function and the baseband cross-correlation function, for each filtered sub-band signal, to a frequency corresponding to the RF frequency of the sub-band associated with the baseband autocorrelation function and the baseband cross-correlation function; and a combiner, associated with the modulator, for combining the up-converted baseband autocorrelation function and the up-converted baseband cross-correlation function, for each filtered sub-band signal, to produce the plurality of sub-band autocorrelation functions.

7. The time domain reflectometry apparatus of claim 6, further comprising:

an analog-to-digital converter, coupled between said tunable receiver and said filter, for converting the sub-band signals to digital sub-band signals at a first sampling rate, said filter producing the filtered sub-band signals in digital form and the demodulator generating the in-phase and the quadrature baseband signals in digital form, and the correlation processor producing the baseband autocorrelation function and the baseband cross-correlation function in digital form at a second sampling rate, the second sampling rate being substantially lower than the first sampling rate; and up-sampling means, coupled between the correlation processor and the modulator, for up-sampling the baseband autocorrelation function and the baseband cross-correlation function before up-conversion by the modulator.

8. The time domain reflectometry apparatus of claim 6, further comprising:
a spectrum analyzer, coupled to said tunable receiver and the demodulator, for analyzing each of the sub-band signals to identify unwanted narrowband signals therein, said filter being adapted to each sub-band signal substantially in response to the identification of unwanted narrowband signals by said spectrum analyzer.

9. The time domain reflectometry apparatus of claim 8, wherein the RF signals carried by the cable under test include an OFDM signal having a plurality of continuous pilot subcarriers, the continuous pilot subcarriers being among the unwanted narrowband signals, said spectrum analyzer identifying the continuous pilot subcarriers by analyzing the in-phase and the quadrature baseband signals generated by the demodulator.

10. A method of detecting a linear impairment in a cable under test carrying RF signals including random and unwanted narrowband signals in a downstream direction, the linear impairment causing a reflection of the RF signals in an upstream direction, said method comprising the steps of:
(a) at a test point upstream from the linear impairment, receiving the RF signals and the reflection of the RF signals as a received signal, the received signal having a frequency spectrum including a plurality of sub-bands at a plurality of RF frequencies, respectively, each of the sub-bands containing a part of the received signal as a sub-band signal;
(b) tuning to the plurality of sub-bands and receiving the sub-band signals, one sub-band at a time;
(c) filtering each sub-band signal, one sub-band at a time, by substantially removing any unwanted narrowband signal from the sub-band signal to produce a filtered sub-band signal;
(d) determining an autocorrelation function of each of the filtered sub-band signals, one sub-band at a time, to produce a plurality of sub-band autocorrelation functions;
(e) combining the plurality of sub-band autocorrelation functions together to form a combined autocorrelation function;
(f) detecting the reflection of the RF signals from the combined autocorrelation function; and
(g) determining from the combined autocorrelation function a time delay associated with the reflection of the RF signals and with the distance from the test point to the linear impairment.

11. The method of claim 10, further comprising the step of:
(h) determining the distance from the test point to the linear impairment based on the time delay determined in step (g).

12. The method of claim 10, further comprising the steps of:
(h) analyzing each of the sub-band signals to identify unwanted narrowband signals therein; and
(i) adapting the filtering in step (c) to each of the sub-band signals substantially in response to the identification of unwanted narrowband signals in step (h).

13. The method of 10, wherein said step (d) includes the further steps of:
(h) generating in-phase and quadrature baseband signals of each filtered sub-band signal;
(i) performing an autocorrelation of the in-phase baseband signal to produce a baseband autocorrelation function and performing a cross-correlation of the in-phase and the quadrature baseband signals to produce a baseband cross-correlation function, for each filtered sub-band signal;
(j) up-converting the baseband autocorrelation function and the baseband cross-correlation function, for each filtered sub-band signal, to a frequency corresponding to the RF frequency of the sub-band associated with the baseband autocorrelation function and the baseband cross-correlation function; and
(k) combining the up-converted baseband autocorrelation function and the up-converted baseband cross-correlation function, for each filtered sub-band signal, to produce the plurality of sub-band autocorrelation functions.

14. The method of claim 13, further comprising the steps of:
(l) after step (b), converting the sub-band signals to digital sub-band signals at a first sampling rate, wherein step (c) includes producing the filtered sub-band signals in digital form and step (h) includes generating the in-phase and the quadrature baseband signals in digital form, and wherein step (i) includes producing the baseband autocorrelation function and the baseband cross-correlation function in digital form at a second sampling rate substantially lower than the first sampling rate; and
(m) up-sampling the baseband autocorrelation function and the baseband cross-correlation function before step (j).

15. A method of detecting a linear impairment in an HFC network carrying a plurality of substantially random signals in a downstream direction, the linear impairment causing the plurality of substantially random signals to be reflected in an upstream direction as a reflected signal, said method comprising the steps of:
(a) at a test point upstream from the linear impairment, receiving the plurality of random signals and the reflected signal as a received signal, the received signal having a frequency spectrum including a plurality of sub-bands at a plurality of RF frequencies, respectively, each of the sub-bands containing a part of the received signal as a sub-band signal;
(b) for each sub-band, converting the sub-band signal to a digital sub-band signal at a first sampling rate;
(c) for each sub-band, down-converting the digital sub-band signal to an in-phase baseband signal and a quadrature baseband signal;
(d) for each sub-band, determining a baseband autocorrelation function of the in-phase baseband signal and a baseband cross-correlation function of the in-phase and the quadrature baseband signals, at a second sampling rate substantially lower than the first sampling rate;
(e) for each sub-band, up-sampling the baseband autocorrelation function and the baseband cross-correlation function to an up-sampled autocorrelation function and an up-sampled cross-correlation function, respectively;
(f) for each sub-band, up-converting the up-sampled autocorrelation function and the up-sampled cross-correlation function to a frequency band corresponding to the RF frequency of the sub-band;
(g) for each sub-band, constructing a sub-band autocorrelation function from the up-converted up-sampled autocorrelation function and the up-converted up-sampled cross-correlation function;
(h) accumulating the sub-band autocorrelation functions constructed in step (g) to form a combined autocorrelation function, the combined autocorrelation function including a correlation peak associated with the reflected signal and the linear impairment;

(i) detecting the reflected signal from the correlation peak of the combined autocorrelation function; and
(j) determining from the correlation peak a time delay associated with the reflected signal and the distance from the test point to the linear impairment.

16. The method of claim 15, further comprising the step of:
(k) determining the distance from the test point to the linear impairment based on the time delay determined in step (j).

17. A method of detecting a linear impairment located downstream of an amplifier in a coaxial cable plant carrying a downstream signal, the amplifier having an input for receiving the downstream signal from upstream of the amplifier and an output for passing the downstream signal to the downstream of the amplifier, the linear impairment causing the downstream signal to be reflected upstream as a reflected signal, said method comprising the steps of:
(a) from a first test point at about the input of the amplifier, receiving the downstream signal;
(b) determining a first autocorrelation function of the downstream signal received in step (a);
(c) from a second test point at about the output of the amplifier, receiving the downstream signal and the reflected signal as a received signal;
(d) determining a second autocorrelation function of the received signal received in step (c);
(e) subtracting the first autocorrelation function from the second autocorrelation function to produce a compensated autocorrelation function detectably revealing a correlation peak associated with the reflected signal and the linear impairment;
(f) detecting the reflected signal from the correlation peak of the compensated autocorrelation function; and
(g) determining from the correlation peak a time delay associated with the reflected signal and the distance from the second test point to the linear impairment.

18. The method of claim 17, further comprising the step of:
(h) normalizing the first and the second autocorrelation functions before step (e).

19. A method of compensating for measurement interference in the detection of a linear impairment located downstream of an amplifier in a coaxial cable plant carrying a downstream signal, the amplifier having an input for receiving the downstream signal from upstream of the amplifier and an output for passing the downstream signal to the downstream of the amplifier, the linear impairment causing the downstream signal to be reflected upstream as a reflected signal, said method comprising the steps of:
(a) from a first test point at about the input of the amplifier, receiving the downstream signal;
(b) determining a first autocorrelation function of the downstream signal received in step (a);
(c) from a second test point at about the output of the amplifier, receiving the downstream signal and the reflected signal as a received signal;
(d) determining a second autocorrelation function of the received signal received in step (c), the second autocorrelation function including a correlation peak associated with the reflected signal and the linear impairment, the correlation peak being obscured by measurement interference; and
(e) subtracting the first autocorrelation function from the second autocorrelation function to produce a compensated autocorrelation function,
whereby the compensated autocorrelation function is substantially free from the measurement interference and detectably reveals the correlation peak.

20. The method of claim 19, further comprising the step of:
(f) normalizing the first and the second autocorrelation functions before step (e).

\* \* \* \* \*